United States Patent
Schwartz et al.

(10) Patent No.: US 6,805,015 B1
(45) Date of Patent: Oct. 19, 2004

(54) DUAL RESOLUTION SYRINGE

(76) Inventors: H. Donald Schwartz, 147 Front St., Marblehead, MA (US) 01945; Douglas G. Sabin, 52 Rockaway Ave., Marblehead, MA (US) 01945

( * ) Notice: Subject to any disclaimer, the term of this patent is extended or adjusted under 35 U.S.C. 154(b) by 0 days.

(21) Appl. No.: 10/443,350

(22) Filed: May 22, 2003

(51) Int. Cl.[7] .................................................. G01N 1/00
(52) U.S. Cl. ................................. 73/864.16; 73/864.13; 417/488
(58) Field of Search ........................ 73/864.13, 864.16, 73/864.18, 864.22, 864.35, 864.23–864.25; 422/100; 436/180; 417/486–488

(56) References Cited

U.S. PATENT DOCUMENTS

| | | | |
|---|---|---|---|
| 1,983,229 A | 12/1934 | Hillier et al. | |
| 2,383,324 A | 8/1945 | LeClair | |
| 2,396,602 A | 3/1946 | Prosch | |
| 3,015,280 A | * 1/1962 | King | 417/401 |
| 3,168,045 A | 2/1965 | Sebastiani | |
| 3,333,548 A | 8/1967 | Lyshkow | |
| 3,471,079 A | 10/1969 | Myers | |
| 3,646,817 A | 3/1972 | Hinchman et al. | |
| 3,695,788 A | 10/1972 | Loomans | |
| 3,704,080 A | 11/1972 | Cross | |
| 3,802,805 A | 4/1974 | Roeser | |
| 3,913,787 A | 10/1975 | Dilger | |
| 3,933,048 A | 1/1976 | Scordato | |
| 3,935,734 A | 2/1976 | Keegan | |
| 4,036,064 A | 7/1977 | Hydo | |
| 4,061,037 A | 12/1977 | Keegan | |
| 4,076,503 A | 2/1978 | Atwood et al. | |
| 4,089,624 A | 5/1978 | Nichols et al. | |
| 4,090,818 A | 5/1978 | Hope et al. | |
| 4,111,051 A | 9/1978 | Tamm et al. | |
| 4,133,211 A | 1/1979 | Sarstedt | |
| 4,242,058 A | 12/1980 | Zakora | |
| 4,255,096 A | 3/1981 | Coker, Jr. et al. | |
| 4,279,991 A | 7/1981 | Hagen et al. | |
| 4,304,138 A | 12/1981 | Tervamaki | |
| 4,449,897 A | 5/1984 | Garrett | |
| 4,493,614 A | 1/1985 | Chu et al. | |
| 4,566,868 A | 1/1986 | Menzies | |
| 4,568,249 A | 2/1986 | Todd | |
| 4,610,544 A | 9/1986 | Riley | |

(List continued on next page.)

FOREIGN PATENT DOCUMENTS

| | | |
|---|---|---|
| DE | 56635 | 3/1891 |
| DE | 0546343 | 3/1932 |
| FR | 2323997 | 4/1977 |
| GB | 0556538 | 10/1943 |

Primary Examiner—Robert Raevis
(74) Attorney, Agent, or Firm—Wolf, Greenfield & Sacks, P.C.

(57) ABSTRACT

A syringe for accurately metering small volumes of fluid samples and with dual resolution capabilities is provided. The syringe permits the aspiration of a tiny sample and also the dilution of a tiny sample with a much larger volume of reagent with the same syringe. The syringe also allows the aspiration of a minute fluid sample and the touchless transfer of the fluid sample from the tip of the syringe. The present invention allows the aspiration resolution to differ from the dispensing resolution. The dual resolution capability also permits the present invention to be substituted for a conventional syringe in existing conventional syringe drive system. The syringe may include a housing, a piston within the housing, and a plunger extending from the housing. A chamber is formed in the housing between the plunger and a sealing means and between the piston and the inner surface of the housing. The chamber may further include first and second portions, where the volume change of the fluid in the first and second portions corresponds to the two different resolution capabilities.

24 Claims, 20 Drawing Sheets

U.S. PATENT DOCUMENTS

| | | |
|---|---|---|
| 4,682,712 A | 7/1987 | Bohnensieker |
| 4,715,791 A | 12/1987 | Berlin et al. |
| 4,730,992 A | 3/1988 | Ogawa |
| 4,815,978 A | 3/1989 | Mazza et al. |
| 4,905,526 A | 3/1990 | Magnussen, Jr. et al. |
| 4,941,808 A * | 7/1990 | Qureshi et al. ............. 417/415 |
| 5,366,904 A | 11/1994 | Qureshi et al. |
| 5,383,372 A | 1/1995 | Qureshi et al. |
| 6,004,117 A * | 12/1999 | Brunk ...................... 417/488 |
| 6,021,680 A * | 2/2000 | Inagaki et al. ........... 73/864.17 |

\* cited by examiner

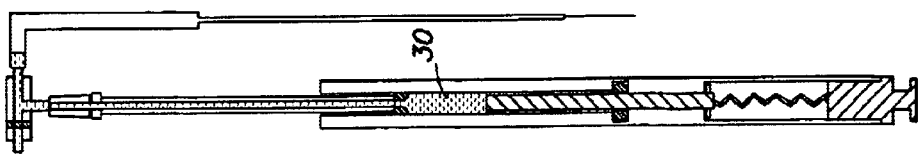
FIG. 6.5
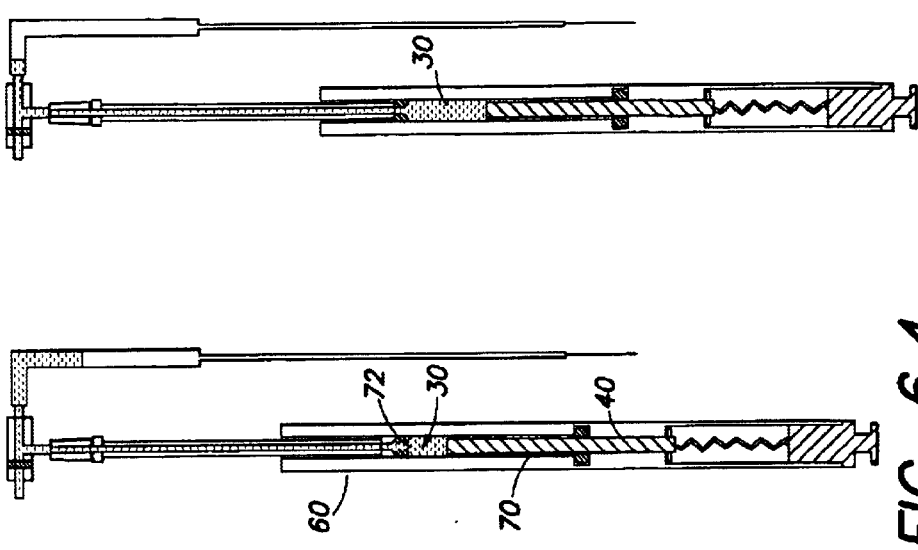
FIG. 6.4
FIG. 6.3
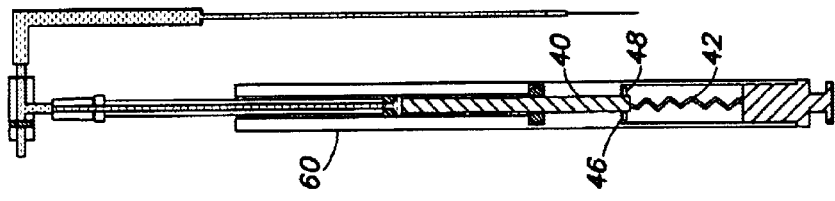
FIG. 6.2
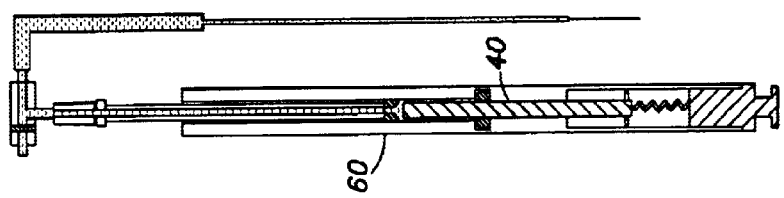
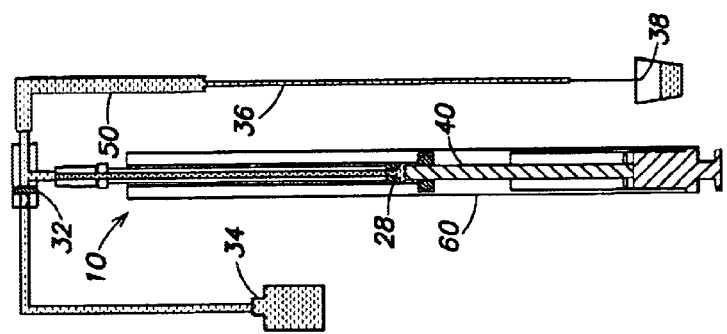
FIG. 6.1

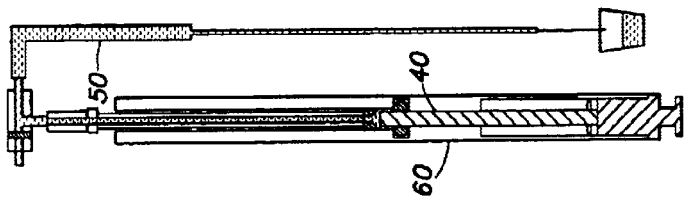
FIG. 7.1
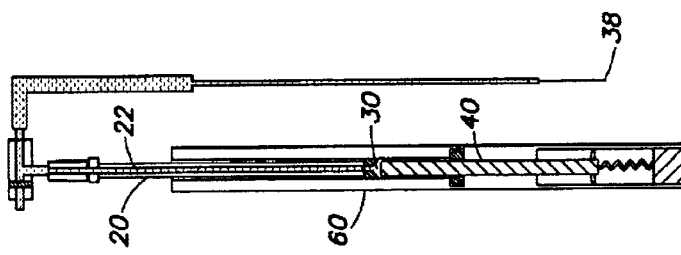
FIG. 7.2
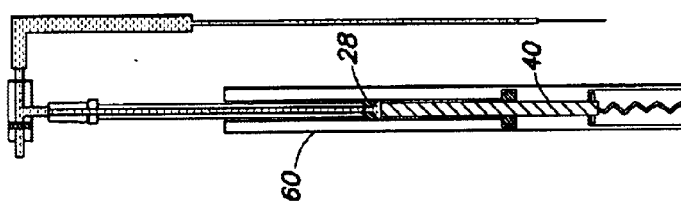
FIG. 7.3
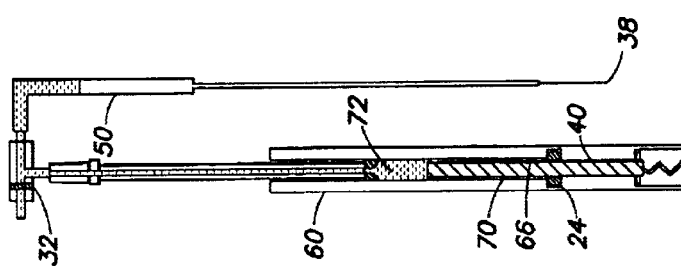
FIG. 7.4
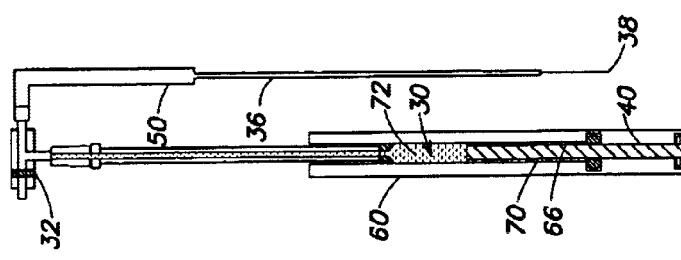
FIG. 7.5

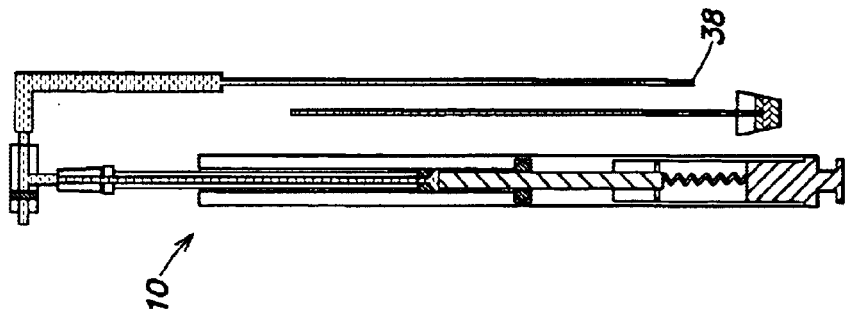
FIG. 9.3
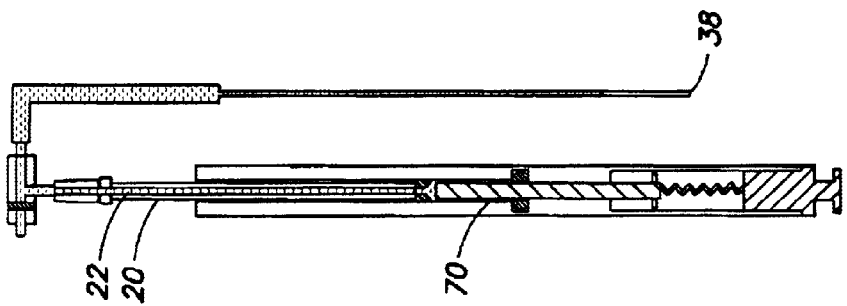
FIG. 9.2
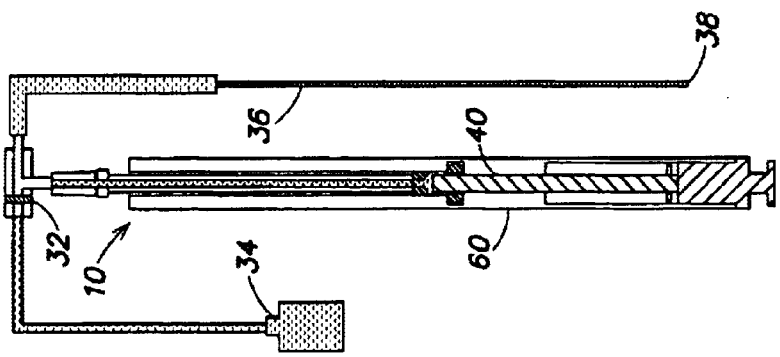
FIG. 9.1

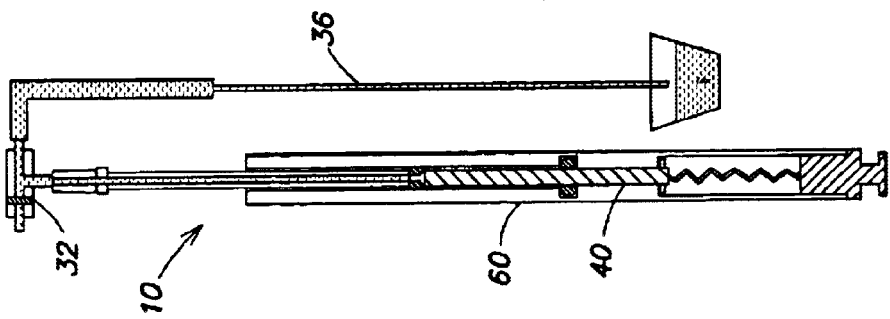
FIG. 9.6
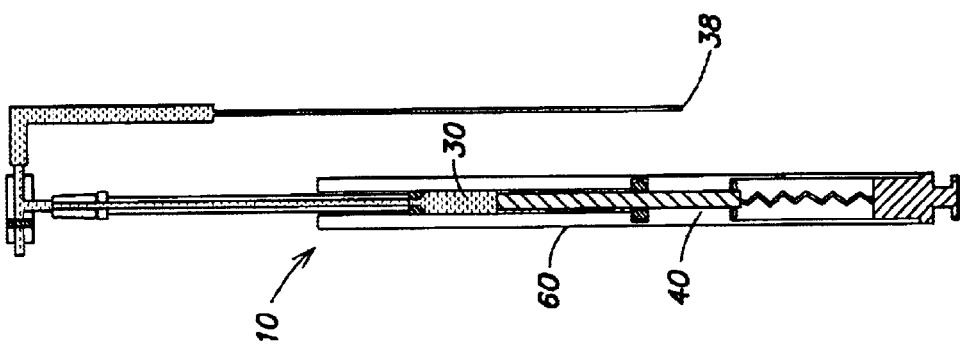
FIG. 9.5
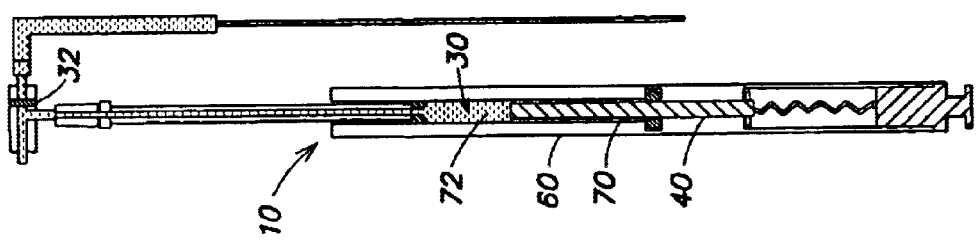
FIG. 9.4

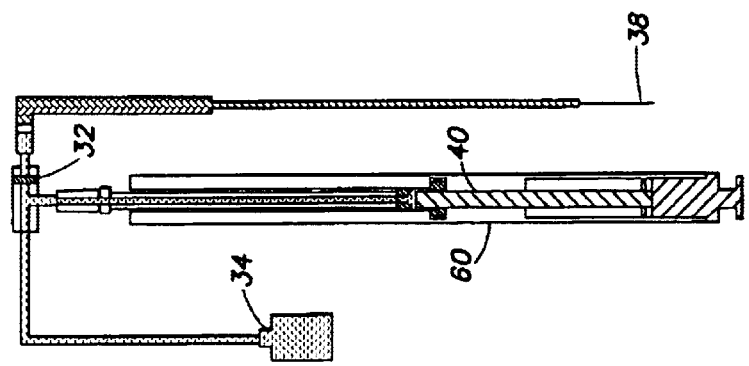
FIG. 10.4
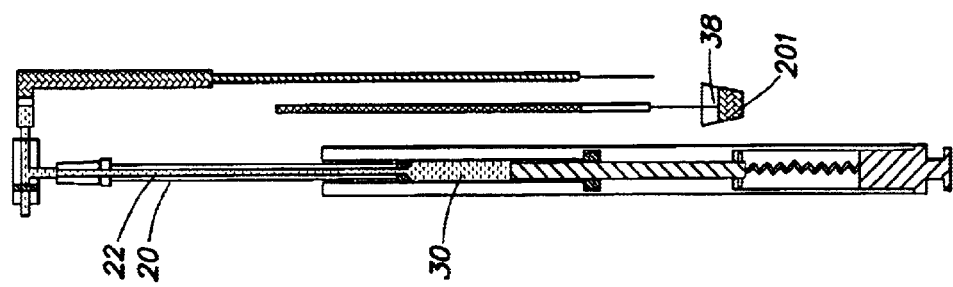
FIG. 10.3
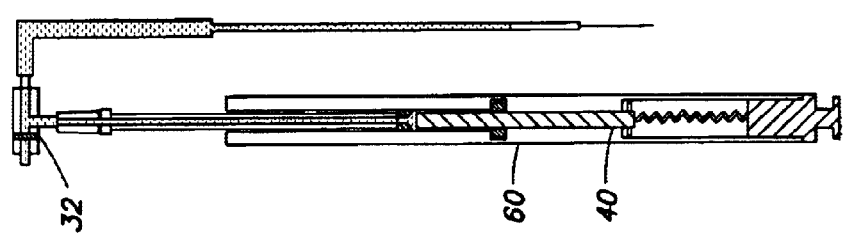
FIG. 10.2
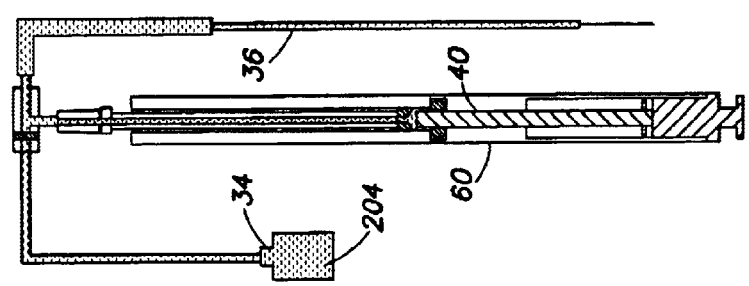
FIG. 10.1

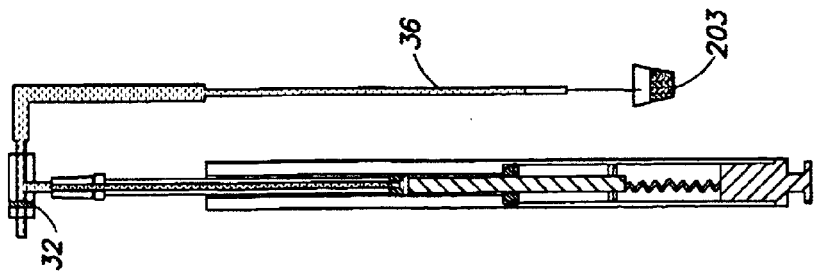
FIG. 10.8
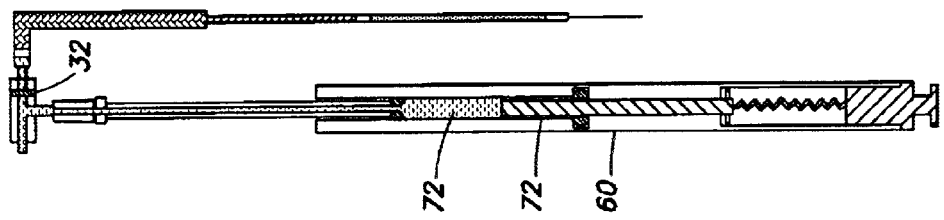
FIG. 10.7
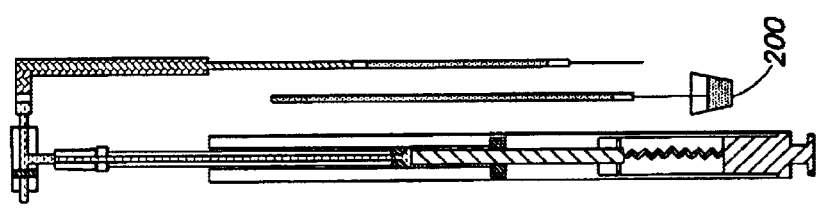
FIG. 10.6
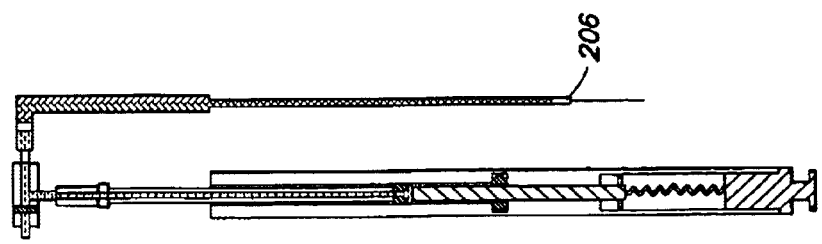
FIG. 10.5

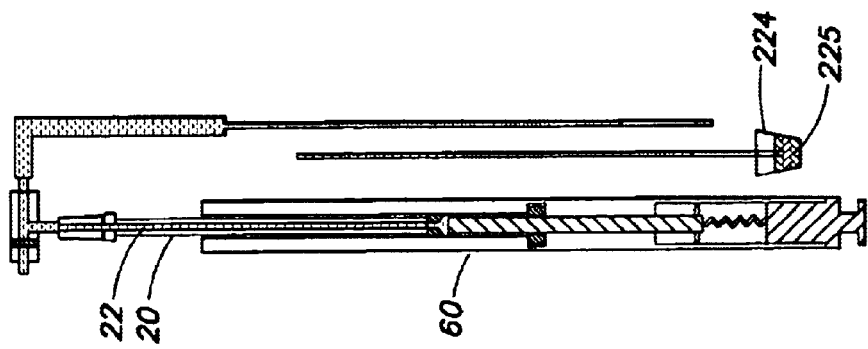
FIG. 11.3
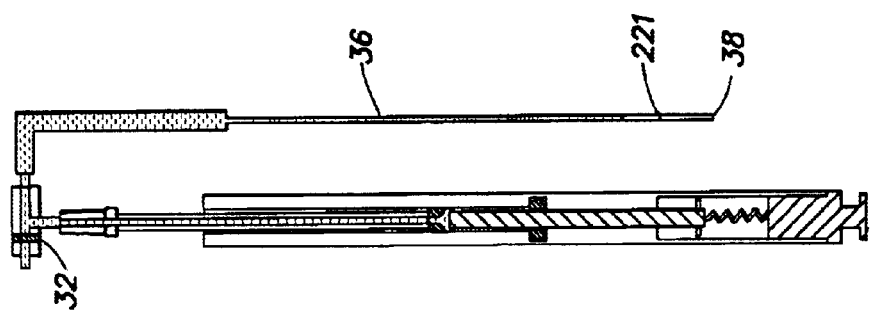
FIG. 11.2
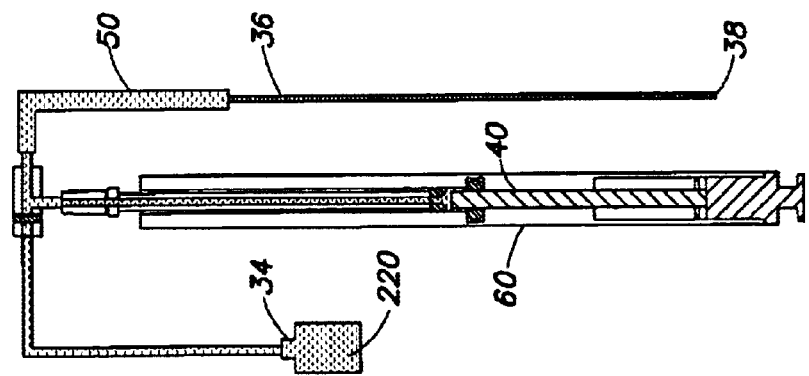
FIG. 11.1

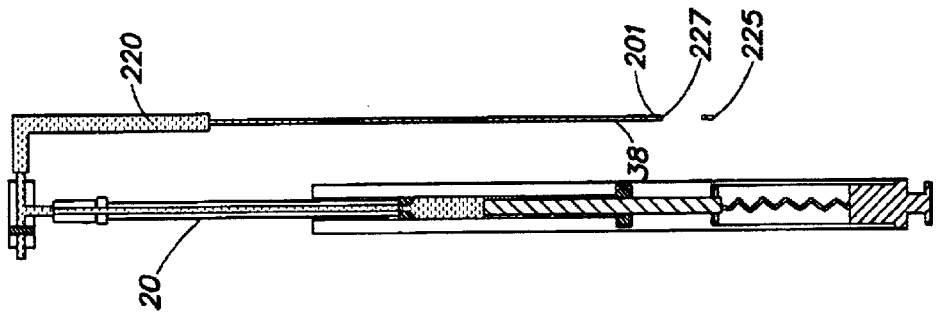
FIG. 11.6
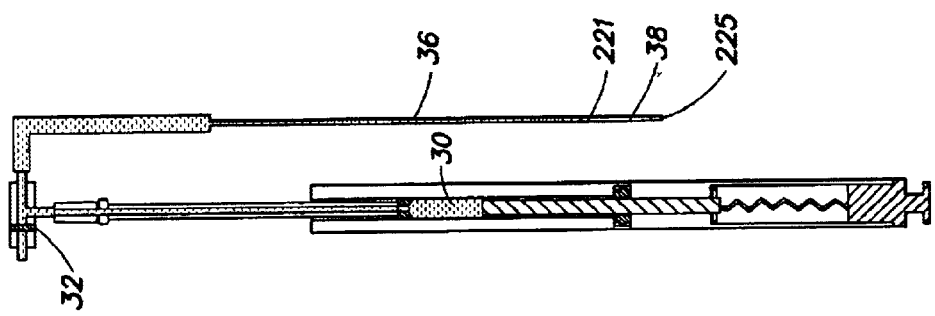
FIG. 11.5
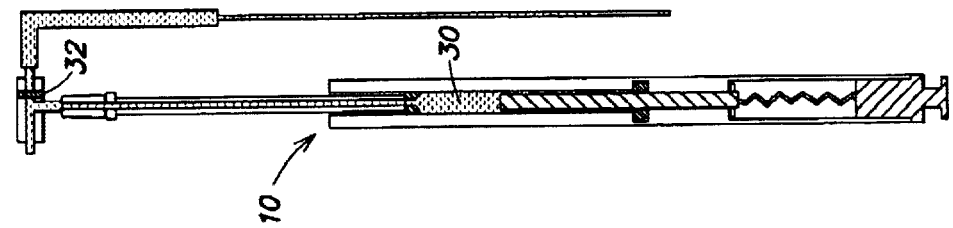
FIG. 11.4

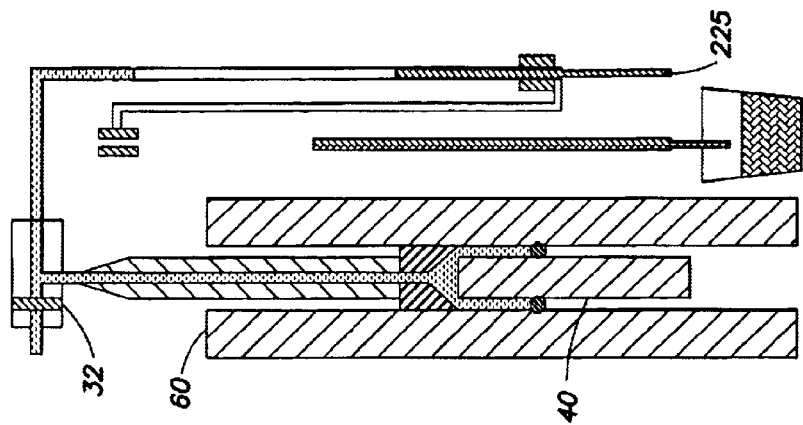
FIG. 12.3
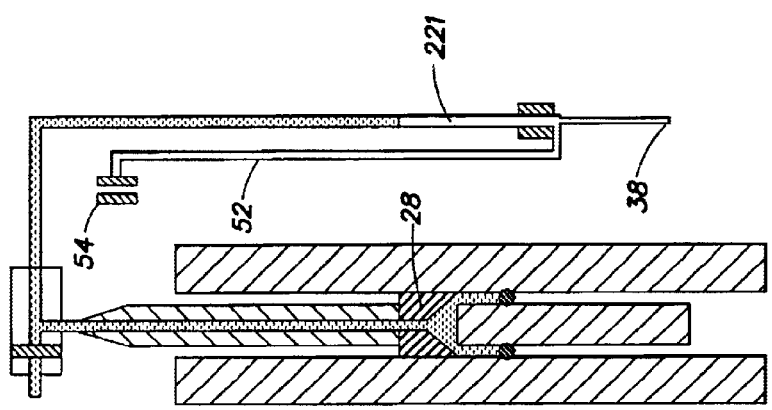
FIG. 12.2
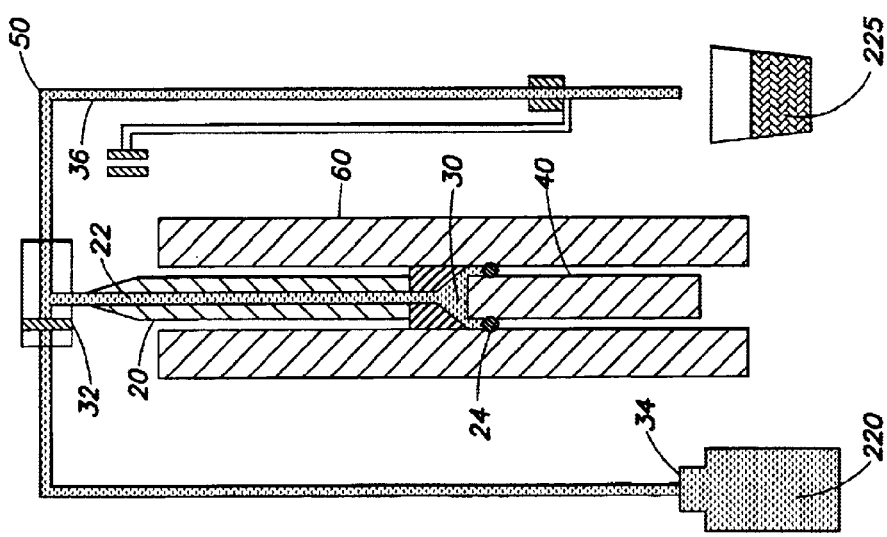
FIG. 12.1

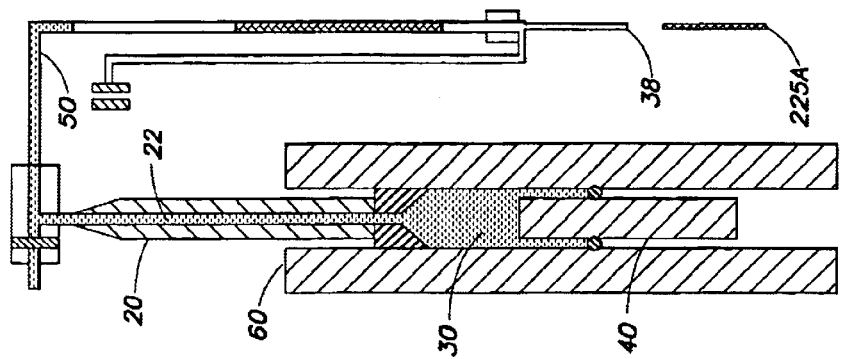
FIG. 12.6
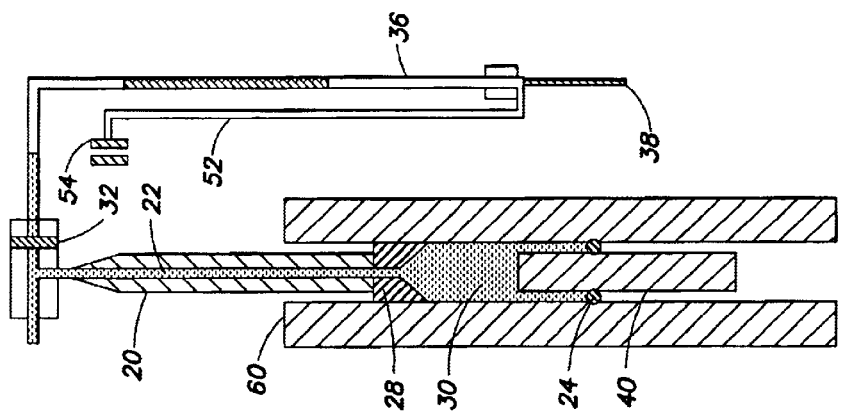
FIG. 12.5
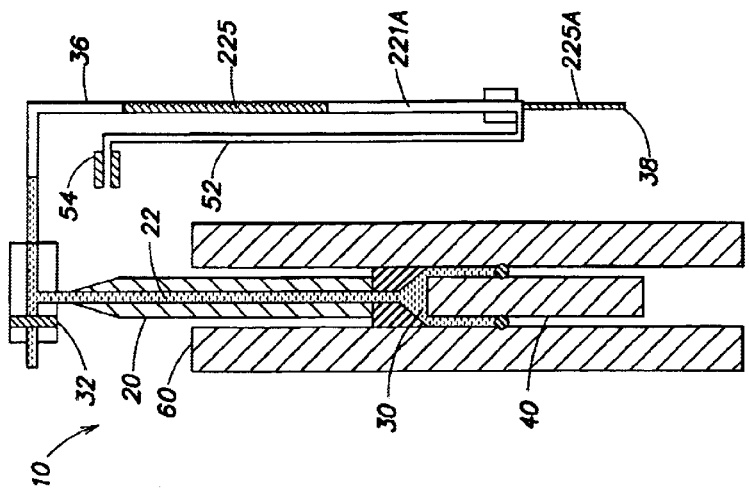
FIG. 12.4

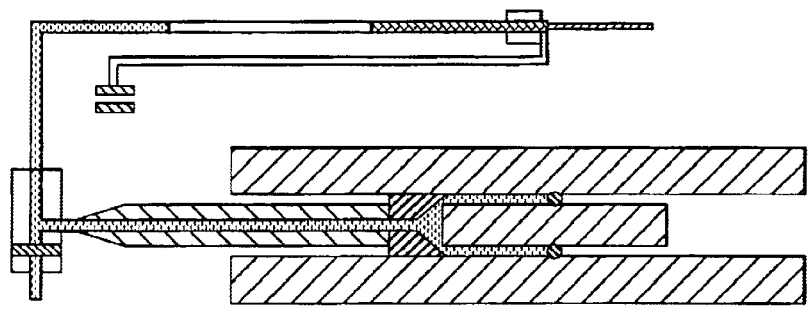
FIG. 12.9
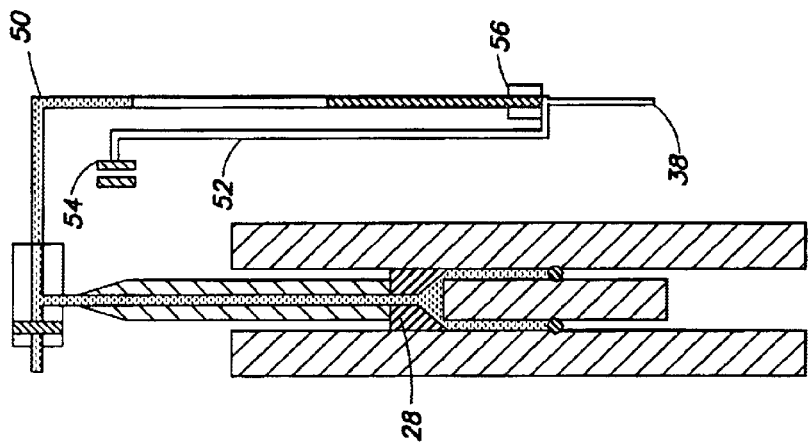
FIG. 12.8
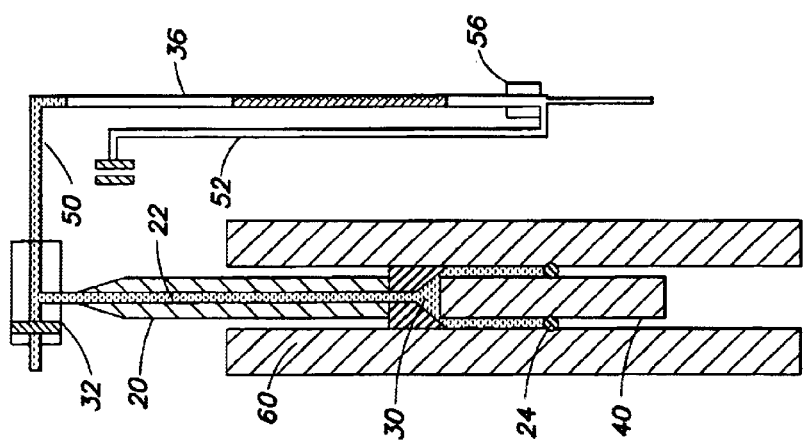
FIG. 12.7

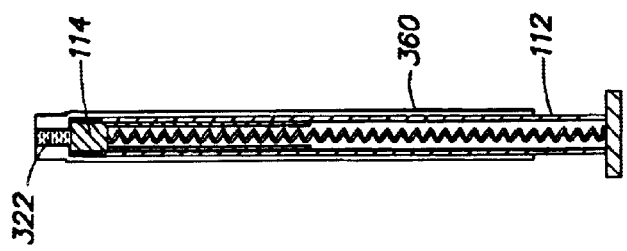
FIG. 14.5
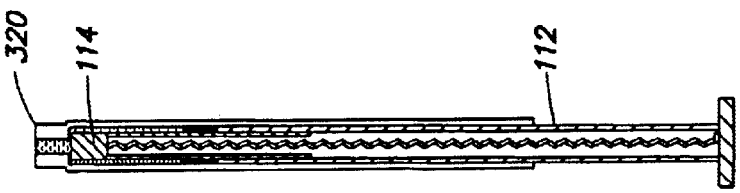
FIG. 14.4
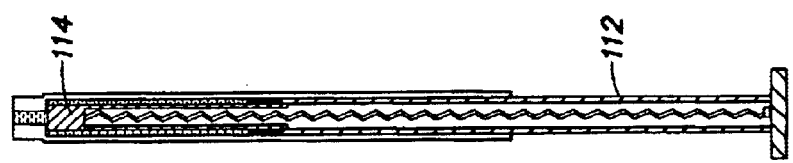
FIG. 14.3
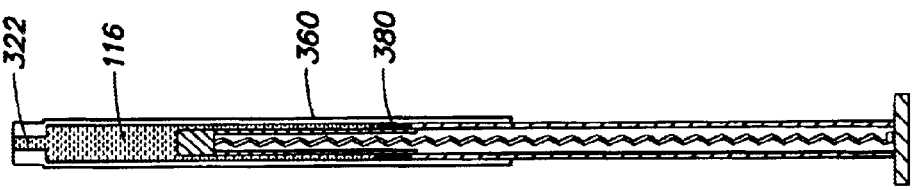
FIG. 14.2
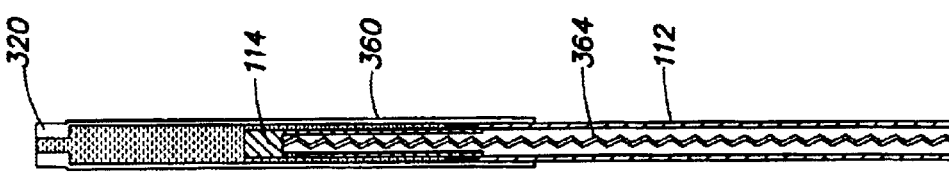
FIG. 14.1

DUAL RESOLUTION SYRINGE

BACKGROUND OF INVENTION

1. Field of Invention

The present invention relates to syringes which can accurately meter small volumes of fluid. In one embodiment, the syringe has dual resolution capability which enables the aspiration of a tiny sample and also the dilution of the tiny sample with a much larger-volume of reagent (or another sample) with the same syringe.

2. Discussion of Related Art

In recent years, diagnostic and analytic tests have required smaller and smaller samples to be accurately metered, both to mix or dilute the samples with larger volumes of various reagents (sometimes in high dilution proportions) and to transfer them separately. There is a demand for samples less than 1 microliter and even less than 100 nanoliters or even 10 nanoliters to be aspirated arid delivered using a syringe or pipette system. Unfortunately, positive displacement devices that can accurately pick up the minute volume of the sample cannot provide enough flow to completely transfer the sample and cannot also meter large reagent volumes. Often times when transferring the sample, the sample will hang onto the tip of the syringe, which requires touching the sample to another surface to free it from the capillary action and surface tension. A touchless transfer, where the sample is ejected out of the syringe with enough force to prevent the sample from hanging on the tip of the syringe, is desired. One way to increase the ejection force of a syringe is to use a syringe with a larger diameter. Yet when the diameter of a syringe is increased to be able to impart the flow rate needed to prevent the "hanging drop" occurrence, the accuracy of the size of the sample aspirated is compromised. While a larger diameter syringe can effect a touchless transfer, it cannot precisely aspirate a tiny sample, such as one as minute as 10 nanoliters.

Multiple pistons of different diameters contained within a single pipette chamber or cylinder such as described below have been known in the past. In such pipettes, spring means are used to keep the pistons in an upper position with a thumb-pressed button so that the pistons can be moved against the force of helical springs to a pre-determined lower position. These systems have been used for a variety of purposes, including the transfer of small volumes of fluids.

In U.S. Pat. No. 5,383,372, assigned to DRD Diluter Corporation, a design is provided with a plurality of pistons that move together and separately in a pipette chamber to measure a small sample and then dispense it with an air blowout to completely remove the sample. While these systems have provided the capability of dispensing small samples with some significant air blow-off or touchless transfer, the demand for using smaller and smaller samples require systems and devices which permit the aspiration and ejection of smaller and smaller samples. These requirements become more acute with the development of programs for genetic testing of patient's blood and blood derivatives. Minute aspirations of less than 100 nanoliters and often even 10 nanoliters are now becoming important.

In many instances, it is desirable to deliver the samples by a "touchless" system that does not require the samples to be touched by another surface, washed out by another liquid, or delivered beneath the surface of another liquid. Therefore new delivery and syringe means are required. Satisfying these developing requirements has been difficult because drops tend to hang onto the tip of the delivery tube forming a hanging drop. The size of the hanging drops can vary widely, and syringes or single piston devices with resolution fine enough to pick up tiny samples simply do not have the flow power to cleanly blow off the sample. A typical sample must be given a velocity when leaving the tip of the probe or pipette of at least approximately 1 meter per second to break free. The smaller the sample, the greater the inaccuracy caused by a hanging drop remaining on the syringe tip. For a variety of reasons, this escape velocity is particularly difficult to achieve with the very small syringes needed to handle very small samples. The problem is further complicated by the requirement that these transfer devices or pipettes be useful for materials that have a widely varied viscosity, from blood derivatives like serum to chemicals like DMSO to various viscous genetic brews. The viscosity variation introduces further variations in the ability of a given sample to escape a confining tip.

Past efforts to achieve desired results involve the miniaturization of syringes to meter smaller and smaller samples. However, small syringes lack the flow power necessary to expel tiny samples. Smaller and smaller probe and pipette tips were developed so that the lower flow rates and pressures the small syringes were able to deliver were artificially increased in an effort to achieve a tip escape velocity. Tips with internal diameters as small as 0.010 inches were developed and in recent years solenoid valve approaches have relied on sapphire drill channels as small as 0.002 inches to provide a sufficient velocity lift at the tip. These delivery tubes result in very long narrow columns of liquid passing through the syringe orifice, which exposes a significantly large proportion of the total fluid volume to damaging surfaces. As a result, genetically related assays which helped trigger the interest in smaller pipettes are compromised because the samples are damaged by the extensive surface area contact to which the assay material is subjected. Therefore, to prevent extensive surface area contact damage to the sample, it is beneficial to not use an excessively small probe tip.

The demand for means and methods for metering very small volumes of material with significant resolution is increasing the need for pumps and pipettes having resolution as fine as that provided by a 10 microliter or even 1 microliter syringe likely required in the future. These precise requirements for accurate metering of very small quantities of material present additional problems. For example, glass is a choice material because much diagnostic work benefits from clear glass for visual inspection. In addition, glass is chemically very inert. However, manufacturing glass tubes with very small internal diameters precise and accurate enough to achieve resolution equivalent to that of a traditional 10 microliter syringe is costly due to the small dimensions. Due to the rugged manufacturable larger sized components of the present invention, prior problems associated with manufacturing tiny syringes are obviated.

Furthermore, traditional syringes for metering small and minute volumes of fluid are troubled with sealing problems. Teflon seals are the industry standard due to its low coefficient of friction and Teflon is chemically inert. However, Teflon has the undesirable characteristic of a high coefficient of thermal expansion and its size can vary considerably with temperature. These slight changes in properties are negligible with a large syringe, but are physically noticeable with traditional syringes that can handle small volumes of fluid. At room temperature, a Teflon seal fit for the internal diameter of a glass syringe can slide smoothly within the housing and seal inside. However at cooler or warmer temperatures, the Teflon seal can be too loose or too tight and "stick" therefore the piston cannot be moved as smoothly within the housing or the seal leaks. Since the present invention is able to achieve the resolution of a small syringe with larger components, thermal variations of the sealing material are enormously reduced with the present invention.

Additional concerns not only center on the need to meter smaller and smaller samples with finer resolution, but also there is an increasing need for a more efficient method and means for delivering the selected sample in its entirety without damaging it. As noted, systems used heretofore commonly attempt to solve this problem by adopting probes and tips with artificially small diameters intended to increase the tip velocity of the material being delivered. These efforts have resulted in mechanisms that produce a ratio far in excess of 10:1 between the length of the sample streaming through the tip and the diameter of the sample, which means greater exposure of the material being delivered to surface contact. Applicant has found that if the height to diameter ratio of the sample in a probe or pipette tip is not greater than 10:1 the sample is likely relatively undamaged due to surface area contact. Furthermore, Applicant found that approximately 1:1 to 10:1 may be optimal for blowing or blasting off discrete samples cleanly without damaging them. Applicant has found for a sample as small as 20 nanoliters (0.02 microliters), for example, a probe that is 0.011 to 0.012 inches in internal diameter will support a stable slug of liquid with a healthy height to diameter ratio of 1:1 whereas a solenoid driven sapphire probe ID of 0.003 inches would require a column 80 times as tall as it is across. For samples in the 100 nanoliters–1 microliters range, a probe diameter of 0.016 to 0.022 inches will permit a healthy sample height to diameter ratio roughly in the 1:1 to 10:1 range, but blowing off such a sample through such a healthy diameter probe with conventional techniques would require a syringe or plunger or piston much larger than could accurately meter or aspirate the sample to start with.

Traditional single piston syringes used for aspirating minute samples are difficult to prime and keep clear of trapped bubbles. Due to the small volume of the fluid sample, a few tiny air bubbles in the chamber can cause a high percentage of measurement error. Furthermore, the tiny outwardly pressing wiper seals of traditional small syringes wear out quickly. Efforts to get around these seal problems have led to using o-rings and compression seals through which a piston slides, however problems have arisen due to the sizes involved. For example, a traditional single piston 100 microliters syringe has an inside diameter of only 0.057 inches (1.4 mm) and a 10 microliters syringe has an ID of only 0.018 inches (0.46 mm). Therefore, trying to seal such a plunger or piston is essentially like trying to seal a needle. The above mentioned sealing and bubble entrapment problems have led to development of non-positive displacement techniques such as piezoelectric technology and solenoids, but these tend to be expensive or require frequent timing-related calibration or are prone to clogging.

Further, the tiny ID of such small glass syringes are difficult to manufacture. The accuracy of measurement using a syringe is at best only as accurate as the tolerances involved with manufacturing. The present invention succeeds in addressing this problem by grinding or lapping the outer diameters of the piston rather than trying to control the inside diameter of the tubing. When the tubing is glass it is typically formed over mandrels. The best commercial glass tubing production technique for a 1 milliliter syringe cannot control the inside diameter better than +/−0.0005 inches, or in extreme special cases down to +/−0.0002 inches. However, using precise outer diameter grinding techniques, the present invention can control the OD to more than an order of magnitude greater. The Applicant has found that this precise grinding of the outer diameter of the piston can be done to match the measured ID of lots of glass tubing to produce a differential resolution as fine as a 1–10 microliter conventional syringe. For example, if one needed resolution as fine as a 10 microliters syringe, such as to aspirate 25 nanoliters, the conventional single piston syringe ID would need to be 0.01814 inches. This small size may be impractical for automated use. With the present invention, the same resolution may be accomplished with a glass tube with a practical sized ID of 0.1814 inches and a piston with an OD of 0.1804 inches. Without sacrificing resolution capabilities, the present invention includes practical sizes to work with and to manufacture.

Continuing with the above example, if the inside diameter of a manufactured+lot of glass tubing was actually 0.1811 inches (rather than the intended 0.1814 inches) due to manufacturing variance, if undetected this could result in errors up to 20% in a dual resolution syringe. However, with the present invention, one can compensate for the varied ID of the glass tubing lots by adjusting the grinding amount of the outside diameter of the piston. Grinding the OD of the piston to 0.1802 inches (rather than 0.1804 inches) will easily compensate for inherent variations in the manufacturing process of the glass in the example above. As explained in more detail below, because the present invention may use the difference in the cross-sectional areas between the glass chamber and the piston it not only permits practical minute volume resolution but it can also compensate for the sometimes relatively crude manufacturing tolerances of glass tubes.

SUMMARY OF INVENTION

The present invention overcomes prior limitations of conventional syringes that cannot accurately meter small volumes of fluid and/or that do not have dual resolution capabilities. Another feature of the dual resolution capabilities provided by the present invention is the ability to facilitate a touchless transfer of a fluid sample from the tip of the syringe. Furthermore, this invention permits positive displacement fluid metering technology to handle small samples along the order of magnitude of microliters (thousands of a milliliter) and even nanoliters (thousands of a microliter). The dual resolution feature also permits the aspiration resolution to differ from the dispensing resolution.

In one illustrative embodiment of the invention, a syringe is provided with dual resolution capabilities. The syringe comprises a housing with a chamber formed therein with a plunger and a piston movable within the housing. The volume of the chamber may vary by movement of the piston or plunger or housing. The chamber may further be defined by a first and a second portion of the chamber wherein the volumes of each portion may change independently of one another.

A method of transferring minute quantities of fluid is also provided, and in another embodiment a method of transferring multiple fluid samples from a single aspirated sample is provided.

In another illustrative embodiment, a syringe is provided operating only under differential capabilities. The invention also includes a device that is capable of diluting a minute sample with an external or internal reagent. Furthermore, the present invention provides a method for metering fluid samples where the aspiration resolution differs from the dispensing resolution.

The present invention helps to overcome the existing problems with the prior art. The dual resolution syringe provides two modes where substantially different volumes of fluid can be metered. Through experimentation, it was found that a large Bulk Mode flow capacity like that of a 1 milliliter syringe in conjunction with a very fine Differential Mode resolution like that of a 10–100 microliters syringe is able to transfer 0.05–1 microliters liquid aliquot and then touchlessly transferring the liquid aliquot by utilizing an interposed air gap. This air gap is designed to be large enough to permit the syringe to dispense the sample out of the syringe while in Bulk Mode. For example, the dual resolution syringe picks up a tiny sample of approximately 1 microliters in the Differential Mode and then uses the Bulk Mode to touchlessly transfer the sample by ejecting the sample out of the syringe along with most of the preceding relatively large 10–15 microliters air gap. Or the dual resolution syringe picks up a minute 0.05 microliters (50 nanoliters) sample and similarly ejects it with most of a preceding relatively huge 2–4 microliters air gap. With the dual resolution syringe, the interposed air gap can be perhaps 1–15 microliters with an aspirated sample volume of 10 nanoliters to 1 microliters. In the present invention, the syringe size utilized in most of the examples provides a difference in the resolution of the two modes of operation of a factor of approximately 100, which was found desirable in experiments.

The present invention also facilitates high ratio dilution by the accurate aspiration of a minute sample combined with the aspiration or internal metering of a relatively large volume of a dilution fluid all by the same device. The volume of the dilution fluid will typically be at least 10 times greater than the volume of the sample. Prior art syringes that could meter the volume required by the size of the dilution fluid are not able to aspirate a minute sample with precision and accuracy. The dual resolution capability of the present invention enables the accurate aspiration and combination of widely different volumes of sample and diluent.

Furthermore, the present invention permits positive displacement fluid handling technology to be used in conjunction with samples in the microliter and nanoliter scale. "Positive displacement" simply means that a space-occupying mass or positive displacement element, such as a piston, enters a fluid-filled space and displaces that fluid from the space in a volume equal to that of the positive displacement element that enters the space. Typical positive displacement syringes are limited in measuring smaller and smaller samples due to manufacturing tolerances, seal performance, difficulty in priming with fluid and clearing trapped air, and general size constraints. In one embodiment, the present invention utilizes the Differential Mode to successfully meter samples as small as 10 nanoliters, exemplifying the use of positive displacement fluid handling technology unhampered by previous size limitations associated with conventional syringes, that by their design have no differential capabilities.

Further the present invention is designed to readily be retrofitted into an existing conventional syringe drive system and module. Previous dual resolution designs, such as the previously discussed U.S. Pat. No. 5,383,372 patent, required a completely new system of supporting hardware. The design of the present invention enables it to be configured and sized similar to conventional syringes and may be readily adaptable to and generally used directly in conventional single piston drive systems. This provides one with the ability to easily upgrade a conventional syringe system to a dual resolution syringe. There is a vast array of prior art conventional single piston syringes equipped with a drive system. With the present invention, one can take out the conventional syringe and replace it with the present invention and have a dual resolution syringe system because the present invention is compatible with the existing supporting hardware for conventional syringes. Additionally, the present invention is applicable to both reusable and disposable syringes.

BRIEF DESCRIPTION OF DRAWINGS

The accompanying drawings are not intended to always be drawn to scale. In the drawings, each identical or nearly identical component that is illustrated in various figures is represented by a like numeral. For purposes of clarity, not every component may be labeled in every drawing. In the drawings:

FIGS. 6.1–6.5 illustrate the aspiration process;

FIGS. 7.1–7.5 illustrate the dispensing process;

FIGS. 9.1–9.6 illustrates the application of diluting a sample with an internal diluent;

FIGS. 10.1–10.8 illustrates the application of diluting a sample with an external diluent;

FIGS. 11.1–11.6 illustrates the process of fluid sample pickup and touchless "blastoff" Transfer;

FIGS. 12.1–12.9 illustrates repetitive touchless "blastoff" transfer from a single aspirated sample;

FIG. 14 illustrates a further alternative embodiment.

DETAILED DESCRIPTION

Figure 1A:
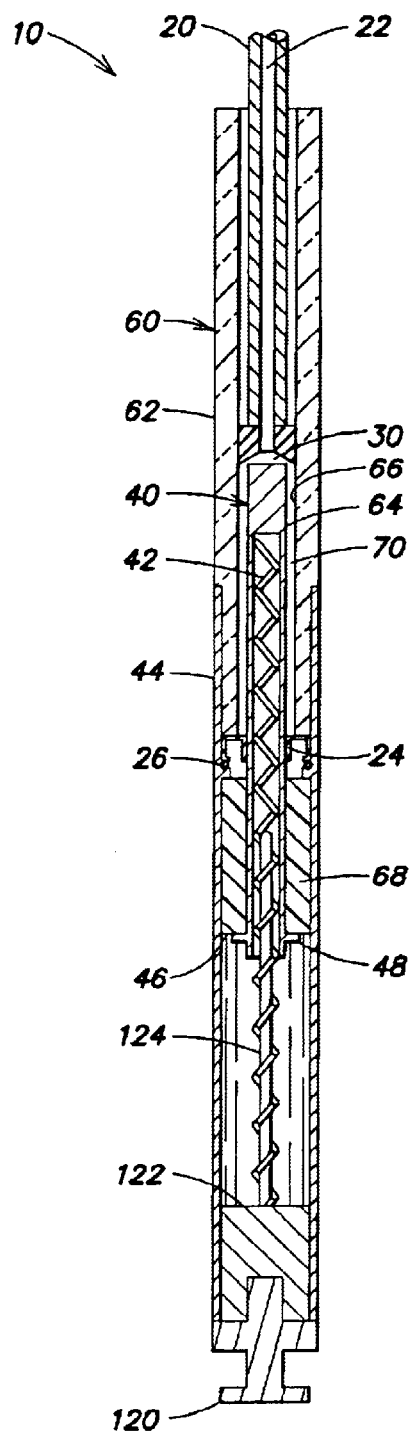
FIGS. 1A and 1B illustrate the syringe in two selected positions in detail.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 1B:
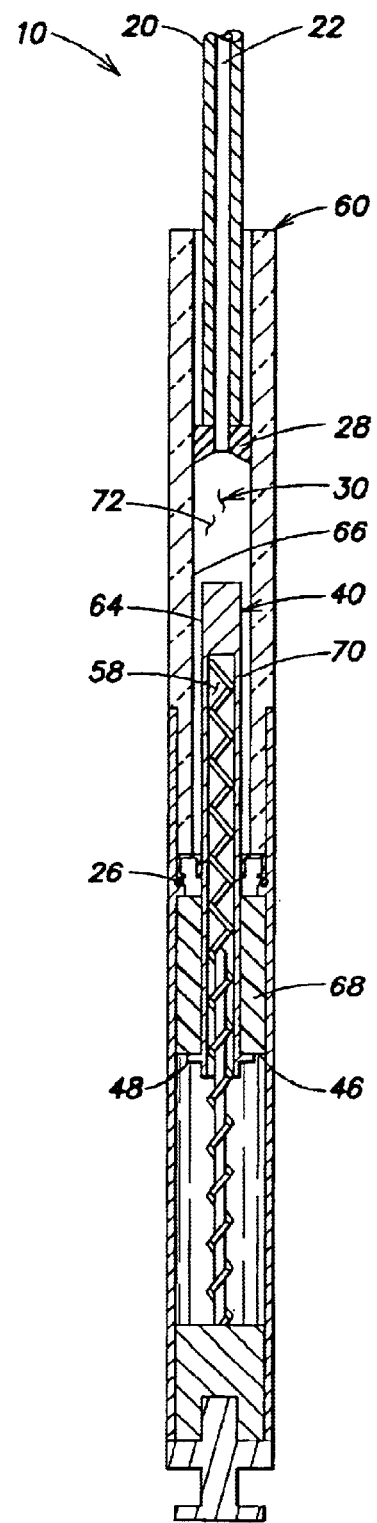

The dual resolution syringe 10 of the present invention is shown in FIGS. 1A–1B which illustrate the syringe in two selected positions, the functions of which will be described in detail in connection with the other figures. The syringe 10 comprises a plunger 20, a housing 60 concentric with and movable relative to the plunger, and a piston 40 movable in and relative to the housing. The housing 60 defines a fluid receiving chamber 30 at one end of the housing. As seen by comparing FIGS. 1A and 1B, the volume of the chamber 30 is variable, controlled by the relative position of the housing 60 and the piston 40. The piston 40 is sized and shaped to occupy selected volumes of the chamber 30 and has an outer surface 64 of the piston that is at least in part spaced from the inner surface 66 of the housing. The piston 40, thus has an end with a contiguous outer surface 64 spaced from the inner surface 66 of the housing, in part defining the volume of the chamber. The outer surface 64 of the piston is preferably uniformly spaced from the inner surface 66 of the housing to form a portion 70 of the chamber 30. This annular portion 70 thus defines an annular chamber between the outer surface of the piston 64 and the inner surface 66 of the housing. Other shaped segments, however, are contemplated. This may be achieved by shaping the outer surface 64 other than cylindrical. A second portion 72 of the chamber 30 includes the portion between the plunger 20 and the adjacent end of the piston 40. In one embodiment, the maximum volume of the first portion 70 of the chamber 30 is significantly less than the maximum volume of the second portion 72 of the chamber 30. A multiplying factor between the cross-sectional areas of the two portions 70, 72 of approximately 10 to 100 is preferred.

The syringe further includes a sealing means 24 which defines an end of the chamber at the end of portion 70. In one embodiment, the sealing means is a compression seal 24 fixed to the inner surface 66 of the housing and is axially movable with the housing relative to the piston 40. In one embodiment, the compression seal 24 is a canted coil spring seal, although other compression seals may be used. Movement of the piston 40 toward the plunger 20 reduces the volume of the chamber 30 by a volume equal to the volume of the piston 40 that moves through the compression seal 24. Conversely, movement of the piston 40 away from the plunger 20 increases the volume of the chamber 30 equal to the volume of the piston moved in the opposite direction through the compression seal 24. In one embodiment, movement of the housing 60 and sealing means 24 relative to the piston 40 changes the volume of the first portion 70 of the chamber and movement of the piston 40 relative to the plunger 20 changes the volume in the second portion 72 of the chamber.

The volume of the chamber 30 may be varied by movement of the housing 60. From FIGS. 1A to 1B, the housing 60 and the piston 40 move down away from the plunger 20 and the volume of the chamber 30 is increased. In one embodiment, the volume of the chamber 30 can be varied by either movement of the housing 60 relative to the plunger 20, movement of the piston 40 relative to the plunger 20, or cooperative movement of both the housing 60 and the piston 40 with respect to the plunger 20.

The syringe further comprises a second sealing means 28 for the chamber 30. This wiper seal 28 is located on the end of the plunger 20 adjacent to the chamber 30. The wiper seal 28 is fixed to the plunger 20 and provides a sealing means between the plunger and the inner surface 66 of the housing and also functions in part as the other defining end of the chamber 30. Located in the middle of the wiper seal 28 is an axial hole 15 providing an exit and entrance for fluid entering the chamber 30 that is contiguous and continuous with an elongated passage 22 extending through the plunger 20. Fluid flows in and out of the chamber 30 through the passage 22. As the volume of the chamber 30 expands and contracts, the fluid in the passage 22 either moves into the chamber 30 or moves out through the passage 22. Additionally, the piston 40 is sized to only move a portion of the fluid in the chamber 30 into the elongated passage 22 extending through the plunger 20. Further, the sealing means 24 and the piston 40 are positioned within the housing 60 to move a portion of the fluid in the chamber 30 into the elongated passage 22 extending through the plunger 20.

Figure 2:
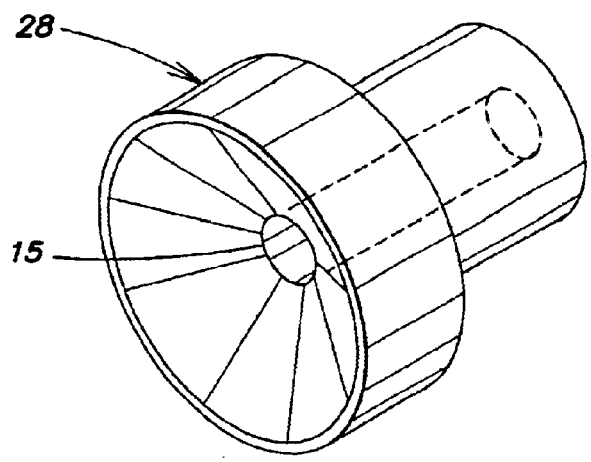
FIG. 2 illustrates a detailed view of the wiper seal shown in the bracketed range in FIG. 1B.

In one embodiment, shown in FIG. 2, the wiper seal 28 is cone-shaped with a channel running therethrough to axial hole 15, positioned with the inverted cone-shaped end proximate the chamber 30 and the other end proximate the plunger 20. The cone shape helps to catch any rising air bubbles and sweeps the air bubbles that are clinging to the wall inward and upward in the cone-shaped seal through the channel and out of the syringe. Small air bubbles within the chamber can lead to measurement inaccuracy in the chamber. The above described embodiment helps to eliminate this problem.

FIGS. 1A–1B show a detailed view of the syringe 10. The housing 60 may comprise a glass annular section 62 and a continuous metal annular section 44. In alternative embodiments, the metal housing may be telescoping, and the exact placement of the glass and the metal may vary. One benefit of the glass section 62 is to maintain optimal visibility of the portion of the piston within the chamber and the wiper seal. It is understood that any type of transparent material, such as glass or plastic, would be beneficial to maintain optimal visibility of the portion of the piston within the chamber.

Attached to the metal section 44 of the housing is a cylindrical tube or bushing 68, preferably made of a low friction plastic of the acetyl family and is fixed to the metal section 44 intermediate the ends of the section, such as by press-fitting it into the metal section. The lower end of the bushing 68 defines a ledge 46 which provides a stop for tab stop 48. Tab stop 48 comprises an annular flange fixed to and extending from the lower end of the piston 40. Tab stop 48 is described at greater length below. A housing seal 26, such as an O-ring may be located between the housing 60 and the bushing 68 to provide a seal between the glass housing 62 and the metal housing 44, or the housing seal 26 may be achieved with epoxy or other bonding material without the use of an O-ring.

The syringe as shown in FIGS. 1A and 1B may be used in conjunction with an ancillary system for successive single aspirations and ejections or multiple sequential aspirations and ejections.

Figure 5:
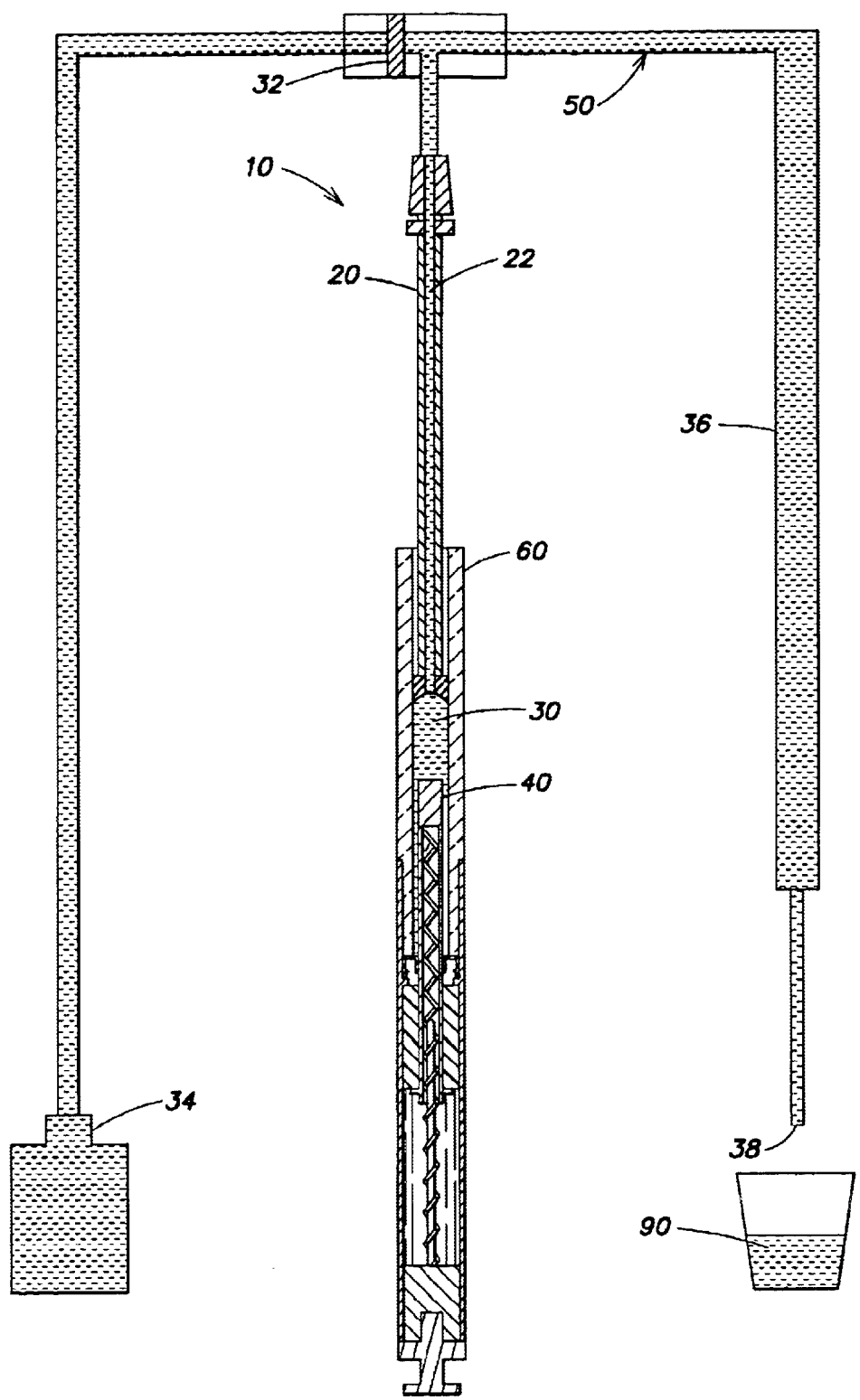
FIG. 5 illustrates a syringe with associated surrounding equipment in one embodiment.

In the embodiment of FIG. 5 which shows a typical hookup for a syringe, a tubular member 50, adjacent the plunger 20, is connected to the top outlet of the plunger 20. The tubular member 50 retains fluid selectively in fluid communication with the fluid contained in the chamber 30 and the passage 22 extending through the plunger 20. The chamber 30 volume decreases by fluid moving out of the chamber 30, into the passage 22, and then further into other portions of the tubular member 50, depending on the position of a chamber valve 32, hereafter described. Likewise, the chamber volume increases by fluid in the tubular member entering the passage 22 extending through the plunger and filling the chamber 30.

At the connection between the tubular member 50 and the plunger 20 is a chamber valve 32. The chamber valve 32 controls the direction of fluid flow out of the passage and the source of fluid into passage 22. The chamber valve 32 defines a storage container 34 side and a probe 36 side of the tubular member 50. The operation of this valve 32 is best illustrated in FIGS. 9 through 11. In FIG. 5, the chamber valve 32 is illustrated in position for fluid communication between the syringe 10 and the probe 36 side. This position is primarily for aspiration and transferring of samples. Other figures, such as FIG. 11.4 show the chamber valve 32 positioned for fluid communication between the syringe 10 and the storage container 34 side. This position is for initially priming the syringe and for increasing the volume of fluid in the chamber 30, hereafter described in detail. When priming the syringe, the tubular member 50 is filled with the fluid continuous with the fluid in the storage container 34. Additionally, the priming step may include moving a portion of the fluid in the tubular member into the chamber 30.

The piston 40 is moved within the housing 60 by forces generated by a resilient upward urging means, such as a helical spring 42, working within the boundaries set by the housing cap 122 and the bushing ledge 46 as shown in FIGS. 1A and 1B. In one embodiment, the piston 40 is hollowed out to define an elongated internal space 58 within which a portion of the spring 42 extends and engages the upper end of the internal piston. The elongated space 58 extends from one end of the piston to a point short of the other end of the piston. The helical spring 42 is positioned to extend into the elongated space with one end of the spring engaging and bearing against the end of the elongated space 58 within the piston, while the other end of the spring engages a housing cap 122 which is secured at the end of the housing remote from the plunger 22. The housing cap 122 is secured to the metal section 44 of the housing. The movement of the piston 40 into the chamber is limited by the tab stop 48 located on the piston or by the fixed plunger wiper seal 28. As the piston moves towards the plunger, the tab stop 48 prevents further movement of the piston as it contacts the ledge 46 on the bushing 68. The spring may always be loaded to keep the piston in position by itself. Other means for moving the piston can also be used, such as by pressurized air or fluid, by gravity, or by other types of linear actuators.

In one embodiment, the syringe is used for selectively dispensing from a chamber a first and second volume of fluid having different volumes respectively, in the order of magnitude of at least 3 to 1. The syringe includes a housing which defines at least in part the chamber, and a piston positioned within the housing, defining a volume less than the volume of a coextensive length of the chamber.

In the embodiment of FIGS. 1A–1B, the housing cap 122 can be grasped to move the housing by hand and also has a tap 120 which is fitted for connection to a motor or actuator (not shown) and is removably attached to the housing 60. In one embodiment, the movement of the housing 60 is automated. The housing 60 may be moved by any form of a motor or actuator. While the housing cap 122 is removably attached to the tap 120 by the use of a threaded connection, any form of connection, permanent or removable would be included in the scope of the invention. The housing cap 122 closing the end of the housing remote from the plunger, further includes a housing cap post 124 fixed to the housing cap which keeps the spring 42 axially aligned. The housing cap post 124 extending coaxially with the helical spring provides lateral stability to the spring 42 as it compresses and expands.

The syringe of this invention provides aspiration shown in FIGS. 6.1–6.5 and ejection or dispensing, shown in FIG. 7.1–7.5 of fluids in two resolutions. Bulk Mode is defined as a coarse (low) resolution/high flow/high volume mode of the dual resolution syringe. In the Bulk Mode, the housing and the piston move together, causing the volume in the chamber to change. In Bulk Mode, the volume is displaced due to a change in the volume of the second portion 72 of the chamber. The volume displaced is equal to the cross-sectional area of the housing multiplied by the vertical displacement of the piston. If the housing is cylindrical and the radius of the inner surface of the housing is "R1" and the vertical displacement of the housing and the piston is "X", then the volume displaced is equal to $\pi(R1)^2 X$. This is how volume displacement in a conventional single piston positive displacement syringe is calculated.

Differential Mode is defined as a fine (high) resolution/low flow/low volume mode of the Dual resolution syringe. In the Differential Mode either the housing moves relative to the piston, or the piston moves relative to the housing. In Differential Mode one of either the piston or the housing is stationary. As previously stated, the outer surface 64 of the piston is preferably uniformly spaced from the inner surface 66 of the housing to form a first portion 70 of the chamber 30. In Differential Mode, the volume displaced is equal to the volume change in the first portion 70 of the chamber. This volume change is equal to the difference between the cross sectional areas of the housing and the piston multiplied by the vertical displacement of either the piston or housing relative to one another. If the piston is cylindrical and the radius of the piston is "R2", then the displaced volume is equal to $[\pi(R1)^2 - \pi(R2)^2]X$.

Bulk and Differential Mode provide many advantages in the present invention. For example, when in Bulk Mode, the syringe is capable of metering a large volume of fluid very quickly and with a high flow rate. Then, in Differential Mode, the syringe is capable of metering a very precise and accurate small volume of fluid very smoothly. Since the syringe is capable of switching back and forth between Bulk Mode and Differential Mode, a wide range of precision and flow rate/volume is obtained with the syringe of the present invention. Alternatively, Bulk and Differential Mode may be used to provide an aspiration resolution that differs from the dispensing resolution.

FIG. 6 shows full range aspiration, starting at the "home" or top position shown in FIG. 6.1, at the start of the Differential Mode. The top of the piston 40 is in contact with the wiper seal 28 and the spring is fully compressed. Previous to this position, the device had been primed by movement of the chamber valve 32 to permit fluid communication between the storage container 34 side and the syringe 10. FIG. 6.2 illustrates downward movement of the housing 60 relative to the piston 40. This operates the differential capabilities of the present invention, as the volume aspirated into the device is equal to the difference in cross-sectional areas between the piston and the housing times the distance or height traveled. This Differential Mode enables high precision and accuracy. FIG. 6.3 shows the transition point between Differential Mode and Bulk Mode, because the ledge 46 on the bushing contacts the tab stop 48 on the piston such that further downward housing movement will drag the piston with it. At this stage, the spring 42 is minimally compressed. As the housing 60 continues to move in the downward direction, FIG. 6.4 shows a midpoint in Bulk Mode. The piston 40 moves down with the housing 60 causing the volume of the chamber 30 to increase in the second portion 72 of the chamber. In Bulk Mode, the volume aspirated is relatively large and the device operates similar to a standard single piston syringe. FIG. 6.5 illustrates a maximum chamber 30 volume.

FIG. 7 shows full range dispensing, starting at the bottom position shown in FIG. 7.1, similar to FIG. 6.5. In FIG. 7.2 the housing moves up in Bulk Mode, causing movement of the compression seal 24 against the inner surface 66 of the housing, displacing a volume of the second portion of the chamber. FIG. 7.3 shows the transition point between Differential Mode and Bulk Mode where the piston 40 contacts the wiper seal 28 while FIG. 7.4 illustrates a midpoint in Differential Mode. By FIG. 7.4, the fluid in the chamber 30 has generally traveled through the elongated passage 22 and is approaching the probe tip 38 for dispensing. FIG. 7.5 shows the device back to the "home" or top position, with the system primed and ready for dispensing.

The combination of Bulk Mode and Differential Mode in the syringe of the present invention enables this device to accurately and precisely pick up a minute sample (in Differential Mode) and then blow it off touchlessly with a high velocity (Bulk Mode) via a sufficiently large safe air buffer zone to provide touchless transfer, as shown and later described in FIG. 8C. This entire process of accurately picking up a minute sample and completely transferring it is shown in FIG. 11.

Figure 8A:
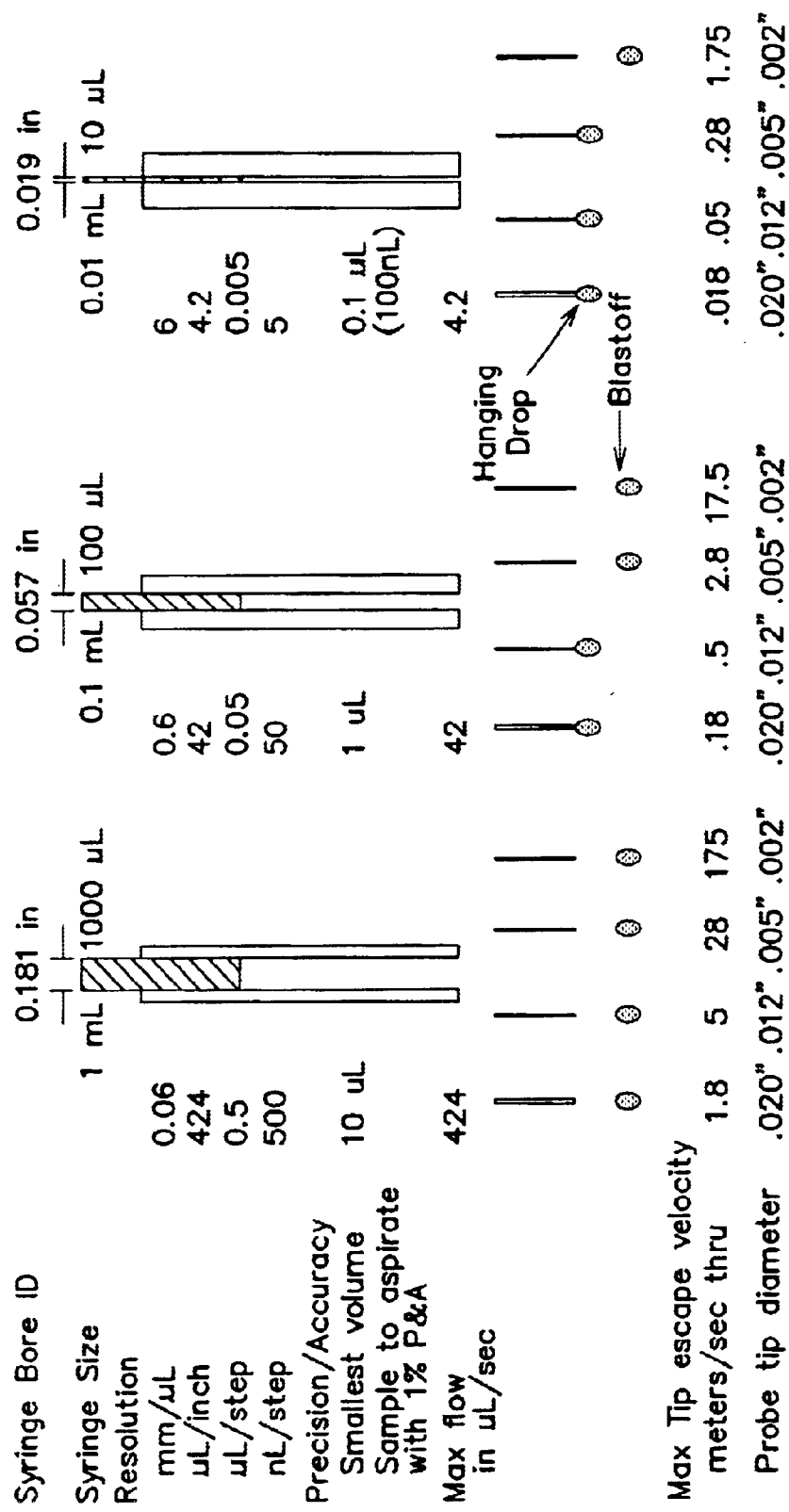
FIG. 8A illustrates escape velocity data for conventional single piston syringes.

FIG. 8A shows the limitations of the prior art conventional single piston syringes. A tip velocity greater than 1 meter/second should prevent a "hanging drop" on the probe tip for most samples. Larger diameter syringes, such as a 1 milliliter syringe with a 0.181" inside diameter can impart enough flow rate to a sample to give a tip velocity over 1 meter/second using a probe tip with a diameter as large as 0.020". The resolution for a syringe of this size is 0.06 mm/microliter or 424 microliters/inch. This equates to a maximum flow of 424 microliter/second, using a fast automated instrument speed of 1"/second. With a traditional whole step stepper motor drive with 2000 steps over a full syringe length of 6 cm (2.37"), the resolution converts into 0.5 microliter/step (500 nanoliters/step). It is generally accepted, and also described in further detail below, that with a 1000 microliter volume syringe, the smallest volume sample one can aspirate with precision and accuracy consistently better than 1% is 10 microliters at the very best. If a smaller sample volume is needed with the same precision and accuracy, then a conventional single piston syringe with a smaller inside diameter is used. However, as shown in FIG. 8A, while the resolution of a syringe is higher with a smaller volume/smaller diameter syringe, the occurrence for a hanging drop increases using a smaller sized syringe, because a sufficient tip escape velocity cannot be reached.

Figure 8B:
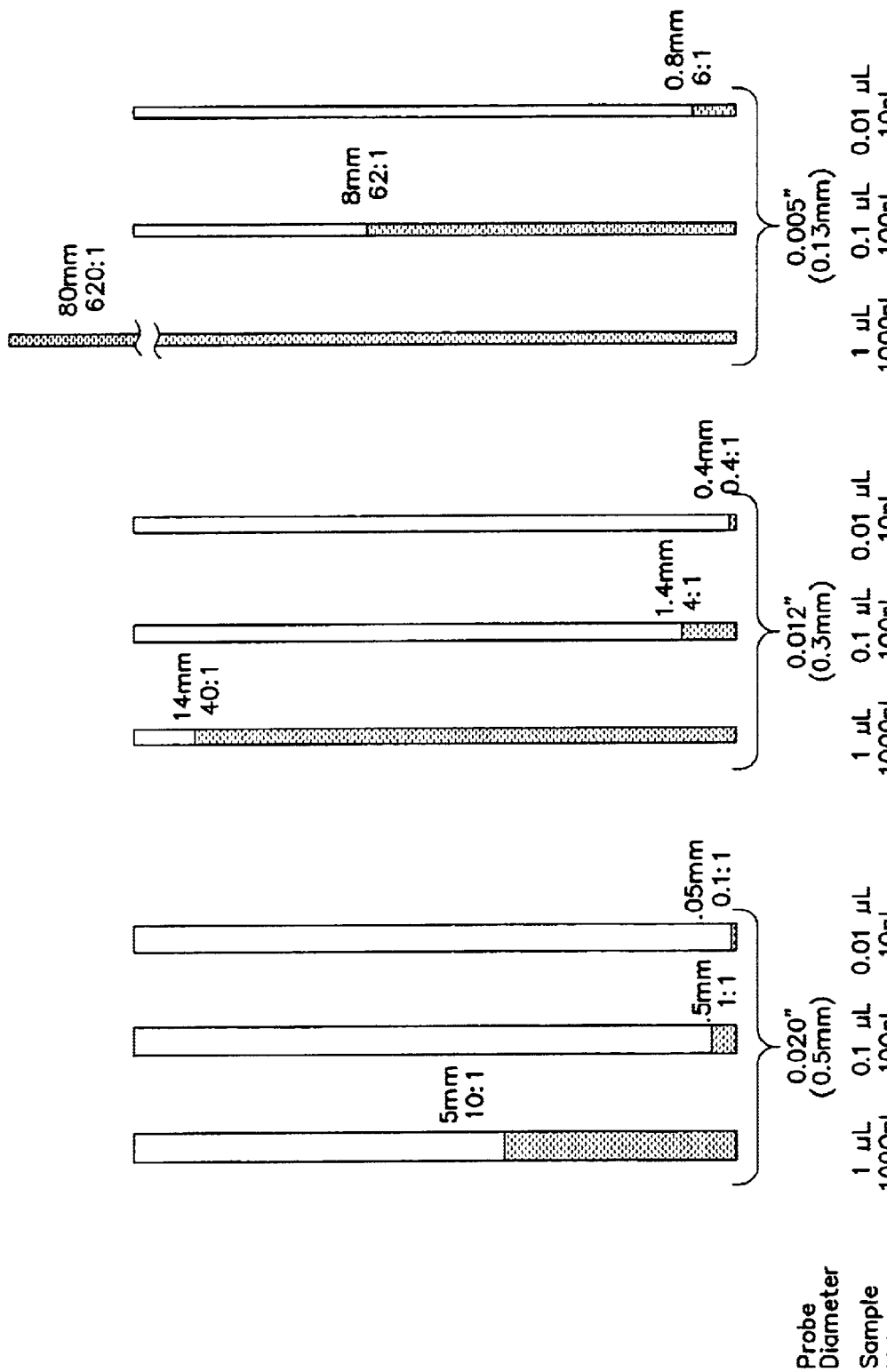
FIG. 8B illustrates column height and ballistic stability ratios for conventional single piston syringes.

For example, if one needed to accurately pick up a 1 microliter sample with a conventional syringe, FIG. 8A shows that the syringe would need to be as small as 10–100 microliters, and that for such a syringe to impart a tip escape velocity of greater than 1 meter/second to that sample, the probe tip would need to be very tiny—approximately 0.002" to 0.005". But FIG. 8B shows that such a necessary tiny diameter probe tip would require that the length of the sample passing through that tip would be 40 to 620 times as much as the diameter, a destructive ratio. FIG. 8B shows that a 0.020" ID probe tip would give a healthy 10:1 ratio for such a 1 microliter sample, and FIG. 8A shows that the 1 milliliter volume syringe size could easily impart the needed tip escape velocity for such a proper sized tip. However, a conventional syringe whose dispensing resolution must equal its aspiration resolution cannot achieve-both. The present invention overcomes these problems by allowing the aspiration resolution to differ from the dispensing resolution.

FIG. 8B further illustrates the limitations associated with the prior art, showing ballistic stability ratios for different sized samples in probes of different diameters. The ballistic ratio is the height to diameter ratio. The greater the ratio the greater the excessive surface tension and surface contact which can cause genetic fragment damage or viscosity effects. A ballistic ratio of approximately 1:1 to 10:1 is ideal to minimize the damage to the sample. However with conventional syringes, this ballistic ratio limits the resolution and the touchless blowoff capabilities of the sized syringe that can be used.

Figure 3:
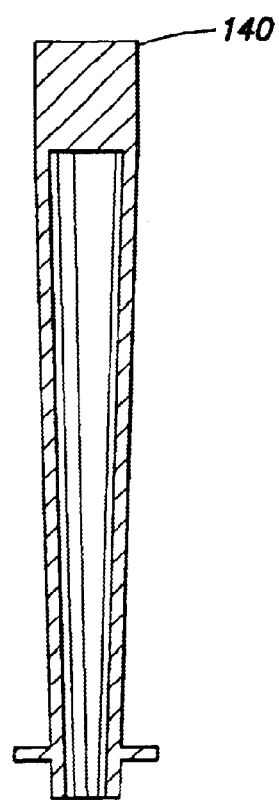
FIG. 3 illustrates a tapered piston.
Figures 3, 8C:
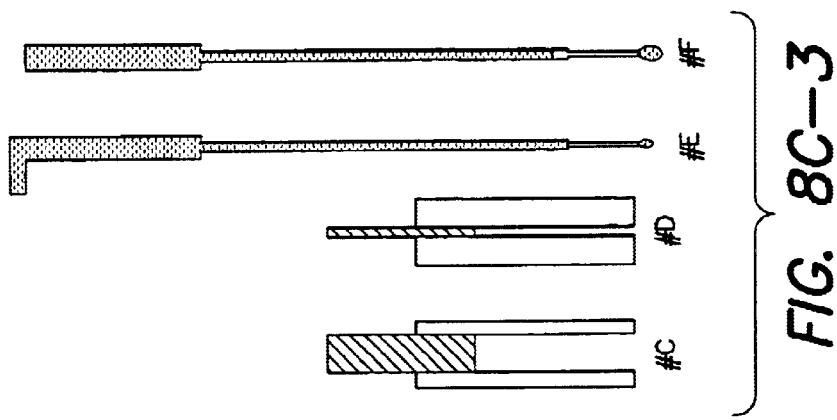
FIG. 8C illustrates the "blastoff" process.
Figures 2, 8C:
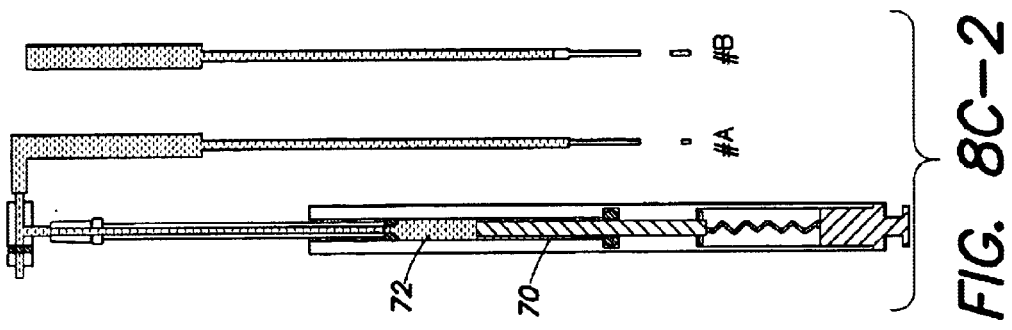
Figures 1, 8C:
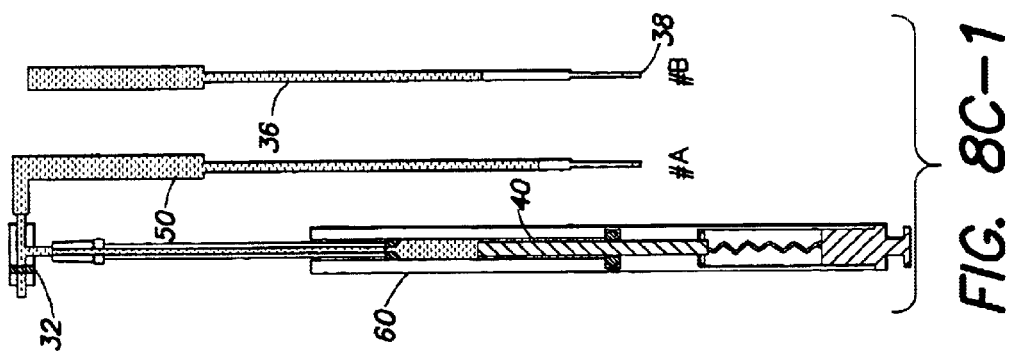

FIG. 8C shows the fundamental blastoff mechanism. FIG. 8C-1 illustrates a side by side comparison of a 50 nanoliter sample #A, and a 500 nanoliter sample #B, aspirated into a 0.012" probe inside diameter and a 0.020" probe respectively. FIG. 8C-2 shows a clean blastoff of both samples despite their small size. This is possible because while both samples are accurately aspirated in Differential Mode, they are dispensed in Bulk Mode. FIG. 8C-3 illustrates how the prior art syringes, such as a conventional 10 microliter syringe, are capable of aspirating the small samples but fail to blastoff the samples due to their feeble flow rates. In 8C-3#C there is schematically illustrated prior art single-piston and chamber which is capable of blast off but not capable of accurately aspirating small samples, while 8C-3#D shows a prior art single piston and chamber having a much higher ballistic stability ratio than 8C-3#C that is capable of aspirating small samples accurately, but not capable of blastoff. FIG. 8C-3#E and 8C-3#F, illustrates how the prior art would dispense using FIG. 8C-3#D.

In addition to making touchless transfer via blastoff of small samples possible, dual resolution makes the syringe capable of the highly precise and accurate dilution of small samples with large volumes of diluent using only one syringe. The present invention enables dilution to occur using an internal source for the reagent as shown in FIGS. 9.1–9.6. In this particular embodiment, a 0.1 microliter sample is diluted with a 300 microliter diluent in a syringe with a 0.012" ID probe tip. This provides a 3000:1 dilution ratio. In this particular embodiment, the syringe has capabilities of holding 3.5 microliters in the first portion 70 of the chamber, and 300 microliters in the second portion 72 of the chamber. In FIG. 9.1, the syringe starts out in home position with the probe primed all the way to the tip 38. FIG. 9.2 illustrates the aspiration of 3 microliters of air. In this embodiment, a stepper motor (not shown) driving the system moves 600 steps to aspirate this quantity in Differential Mode. In FIG. 9.3 the sample is brought to the probe tip 38 and 0.1 microliters is aspirated in Differential Mode by movement of the stepper motor 20 steps. FIG. 9.4 shows the valve changing to the storage container 34 side and then the syringe 10 moves down in Bulk Mode to increase the volume of the chamber 30. To eliminate backlash, the housing then moves up a small amount. Then the chamber valve 32 changes back to the probe 36 side. FIG. 9.6 shows the dispensing of the 0.1 microliter sample along with 300 microliters of the diluent, which in this example is the internal priming fluid. To dispense the fluid, the syringe 10 moves in Bulk Mode. The tiny sample that was accurately aspirated is ejected from the syringe with a controlled amount of an internal reagent. This may be done at a very high velocity to achieve even mixing.

The invention also enables highly precise and accurate dilution of a tiny sample using an external source for the reagent as illustrated in FIGS. 10.1–10.8. A larger dilution fluid 201 is aspirated in Bulk Mode and then a tiny sample 200 is aspirated in Differential Mode. Both the sample and the diluent are then ejected from the syringe for mixing in container 203. A single conventional syringe cannot perform a highly precise and accurate dilution at a dilution ratio higher than 100:1 at best because the syringe is not capable of accurately metering such a wide range of volumes of fluid. However, the Bulk Mode in conjunction with Differential Mode in the instant invention makes such extreme dilution with one syringe possible. Typically, the volumetric difference between Bulk Mode and Differential Mode is at least 3:1 and is 100:1 in most of the examples given.

FIGS. 10.1 to 10.8 shows a syringe similar to the one in FIG. 9 where the syringe has capabilities of holding 3.5 microliter in the first portion 70 of the chamber 30, and 300 microliter in the second portion 72 of the chamber. In FIG. 10.1 the syringe is shown completely primed with the storage container solution 204. In FIG. 10.2, 10 microliters of air is aspirated by movement of the housing 60 and in FIG. 10.3, a 300 microliter external reagent or diluent 201 is aspirated in through the probe tip 38. In FIG. 10.4, the chamber valve 32 changes and the housing 60 moves up to empty some of the priming fluid in the chamber 30 to the storage container 34 side. Another volume of air 206, such as 3 microliters, is aspirated in FIG. 10.5, and in FIG. 10.6, a 100 nanoliters sample 200 is aspirated. This second volume of air separates the diluent 201 from the fluid sample 200. In preparation for dispensing the diluent and the sample, FIG. 10.7 shows the syringe repositioning back to Bulk Mode by movement of the chamber valve 32 to the storage container 34 side and movement of the housing 60 all the way down filling the chamber 30. Once repositioned, FIG. 10.8 shows the valve switching back to the probe 36 side to dispense the approximately 308 microliters, comprising the 100 nanoliters sample, the 3 microliters volume of air, the 300 microliters diluent, and approximately half (~5 microliters) of the first volume of air. Dispensing a portion of the air volume between the diluent 201 and the priming fluid 204 assures that the full amount of the diluent is dispensed, without the risk of intermixing with the priming fluid.

The above dilution examples show how a minute fluid sample and a large fluid volume can be aspirated into the syringe of the present invention with precision and accuracy. The precision and accuracy with which a standard syringe can meter fluid is related to the volume metered in comparison to the total volume capable of being metered by that syringe. For example, a conventional 1 milliliter volume syringe cannot achieve 1% precision and accuracy with a sample smaller than 0.01 milliliters (10 microliters) at best. A conventional single piston syringe with a tiny 10 microliter volume, that might be used primarily in research applications, might be capable of achieving 1% precision and accuracy aspirating a sample as minute as a 0.1 microliter (100 nanoliters). However, the present invention enables a far broader range of sample volumes to be metered with precision and accuracy of at least 1%. In a conventional single piston syringe, the maximum dilution volume ratio one can achieve with at least 1% precision and accuracy is 100:1. However, because the present invention implements two modes, a volume ratio greater than 100:1 and even greater than 3000:1 may be achieved with the same precision and accuracy.

In one embodiment, the present invention consists of a device that can provide fluid aspiration as fine as that of a 10 microliters volume syringe (4.24 microliters/inch, inside diameter of 0.01814") while at the same time, when driven at a speed of 1 inch per second, can provide flow as fast as a 1 milliliter volume syringe (424 microliters/inch, inside diameter of 0.01814") to deliver a sample through even a large 0.20" ID tube (#21 gage hypodermic needle) at a velocity of 1.8 meters per second.

In a further method of operation of the syringe 10 shown in FIG. 11, a tiny or minute quantity of a fluid sample is transferred from one place to another, sometimes referred to as "pipetted". Tiny is defined as a small quantity in the order of magnitude of 1 microliters–100 nanoliters. Minute is defined as a small quantity in the order of magnitude of 10–100 nanoliters. The tubular member 50 is usually primed with a first fluid 220, which involves filling a portion of the tubular member 50 with the first fluid as shown in FIG. 11.1. The tubular member is primed with the fluid 220 from the storage container 34 to flush out any air or fluid from the tubular member and chamber 30. The priming step also includes filling the chamber 30 and the passage 22 extending through the plunger with the first fluid 220. Then in preparation for the aspiration of the sample, a portion of the tubular member near the first end or probe tip 38 of the tubular member is devoid of the first fluid 220. In the embodiment of FIG. 11.2, this is accomplished by aspirating a quantity of air 221. This amount of air is defined as an air gap or air buffer zone which facilitates the touchless transfer of the minute sample. Then, the probe tip 38 is introduced into a reservoir 224 of the sample 225, as shown in FIG. 11.3. FIG. 11.4 illustrates that once the sample 225 is aspirated, the chamber valve 32 changes to provide fluid communication between the syringe 10 and the storage container 34 side. In preparation for ejecting the sample, with the syringe 10 open to the storage container 34 side, the housing 60 moves farther down, repositioning to the Bulk Mode zone and increases the volume of the chamber 30 with fluid from the storage container 34 side. Differential Mode may provide enough precision and accuracy for larger volumes in which the error from the hanging drop may be proportionately small, but to blowout a tiny sample accurately without the significant (and often variable) error of a hanging drop, Bulk Mode is generally needed to provide the necessary ejection or air blowout velocity. By first switching the chamber valve 32, the syringe is repositioned to Bulk Mode without disturbing the aspirated sample on the probe 36 side. When the repositioning is completed, as shown in FIG. 11.5, the chamber valve 32 switches back to provide fluid communication between the syringe 10 and the probe 36 side. The exact position in the Bulk Mode zone does not matter as long as it starts at a position that gives enough room to let the syringe blowout the sample and the desired volume of air out and off of the probe tip 38, while still remaining in the Bulk Mode zone.

The fluid sample 225 is ejected from the first end 227 of the tubular member by movement of the first fluid 220 from the tubular member. This forces a quantity of air positioned between the first fluid and the fluid sample from the tubular member, entraining the fluid sample 225, and positively moves it from the first end 227 by the force of air movement as shown in FIG. 11.6. The volume of air 221 ejected is significantly larger than the minute sample 225. The volume of air along with the probe tip 38 diameter permit the minute sample 225 to be ejected intact from the probe tip 38 with the necessary high flow rate of Bulk Mode. The quantity of entrained air 221 positioned between the priming fluid 220 and the fluid 225 sample transmits the high flow rate to the sample to impart an air blowout velocity greater than 1 meter per second to the sample.

Experimentation has shown that if the sample volume picked up was 1 microliter with an 0.020" inside diameter probe, then the desired total air blow out volume may be 7 or 8 microliters out of a total 10–15 microliters of air aspirated. If the sample volume picked up was 0.1 microliters (100 nanoliters) or less with, for example a 0.012" ID probe then the total air blow out volume may be 2 microliters out of a total of 3–5 microliters of air aspirated. Preferably, the volume of the first fluid aspirated is in the order of magnitude of 10 times the second volume of fluid. However, the first volume of fluid may be in the order of magnitude of 100 times the second volume of fluid or even greater.

In a further method of the present invention, a fluid sample in the order of magnitude of about 1 microliter or less is delivered by placing the sample in a tubular member having an open end and an inner diameter of in the order of 0.020" or less, and thereafter impelling the sample through the open end under the influence of a fluid medium moving through the tubular member at a speed in excess of about one meter per second.

A further embodiment of the invention shown in FIG. 12 enables the aspiration of a sample and subsequent sequential touchless ejections of multiple smaller discrete portions of the sample. As previously described and shown in FIG. 12.1–12.2, first the tubular member 50 is primed and a volume of air 221 is aspirated up into the probe tip 38. The fluid sample is then brought into contact with the probe tip 38 to aspirate the desired volume of the sample 225 as shown in FIG. 12.3. In one embodiment, the volume of the fluid sample aspirated is much larger than the volume of the individual sample volume aliquots or portions that will be discretely ejected. For example, if a preferred individual sample volume is 500 nanoliters, then the total sample volume aspirated might be 10 times that amount.

A second volume of air 221A is then aspirated through an air shunt 52 shown in FIG. 12.4. The air shunt 52 is an extension of the probe 36 body that branches off ending in an air shunt valve 54 which may be a valve position shared with the chamber valve 32. The air shunt 52 extends from the tubular member in fluid communication with the air shunt valve 54. When the air shunt valve 54 is opened, air enters the air shunt 52, bisecting the aspirated fluid sample 225 into two distinct volumes. The air shunt 52 is positioned so that the volume of the fluid sample between the entrance of the air shunt into the probe body and the probe tip 38 after the bisection is equal to the desired individual sample aliquot volume. Therefore the individual sample volume, or separated aliquot 225A, is separated from the remaining fluid sample in the tubular member 50 by the volume of air 221A aspirated through the air shunt valve 54. Once the individual sample volume of the desired amount is positioned at the probe tip 38, the air shunt valve 54 is closed.

In preparation for ejecting the individual sample, the chamber valve 32 is switched from the storage container 34 side to the probe 36 side and the syringe is positioned to Bulk Mode prior to ejecting the sample, as shown in FIG. 12.5. Since the chamber valve 32 was switched to provide fluid communication between the syringe 10 and the storage container 34 side, the priming fluid entering the chamber 30 comes from the storage container 34. The chamber valve 32 then switches back to open up to the probe 36 side, opening up the passage 22 leading into the chamber 30 to the probe 36 side. Remaining in Bulk Mode, the housing 60 then moves up towards the plunger 20 to eject the individual sample volume 225A out of the tubular member 50 at a high velocity by movement of the priming fluid toward the probe tip 38 shown in FIG. 12.6. In one embodiment, the housing 60 moves up a distance calculated to dispense a volume of air equal to approximately 50–80% of the volume of air 221A bisecting the fluid sample 225 volume. For example, if 5 milliliters of air is aspirated through the air shunt valve 54, the housing 60 moves up towards the plunger 20, a distance calculated for the ejection of about 3 milliliters out of the probe tip 38. This volume ejected from the tubular member 50 does not have to be precise. The volume of air 221A selected is intended to permit a non-precise ejection by the coarse Bulk Mode that extends safely into the main body of the air buffer zone, thus also expelling the much smaller and accurately sized sample aliquot 225A at the tip 38. This will completely blastoff the individual sample aliquot from the tip 38 while still maintaining a separation between the remaining fluid sample in the tubular member 50 and the priming fluid in the tubular member.

To set the system up for the next individual sample volume ejection, the remaining fluid sample in the tubular member 50 must be repositioned as shown in FIG. 12.7, to measure out the desired volume of the next individual sample volume aliquot. In one embodiment, the fluid sample is repositioned with an air detector 56 located on the tubular member 50, located approximately where the air shunt 52 branches out from the probe 36. A conventional air detection system may be used, depending on the specific applications involved. One embodiment of the present invention employs an optical detector that senses the change between air and a liquid. However, other detection systems may be used. Using a detector, the fluid sample in the tubular member 50 is moved toward the first end or probe tip 38 until the fluid sample is adjacent the air shunt 52 as shown in FIG. 12.8. Then, the remaining fluid sample is further moved toward the first end until the fluid sample is adjacent the first end or probe tip 36 as shown in FIG. 12.9.

The above precise repositioning of the sample flush with the probe tip 38 was accomplished by the Differential Mode of the dual resolution syringe as follows. First, the:chamber valve switched to the storage container side and the housing 60 and the compression seal 24 moved up with respect to the plunger 20, reaching the bottom of the Differential Mode. The housing then moves slowly up in the Differential Mode, slowly and smoothly pushing the remaining sample downward. In one embodiment, as soon as the air detector 56 detects the leading edge of the sample the pump motor stops, thus stopping the movement of the housing 60 and the compression seal 24 as shown in FIG. 12.8. Conventional circuitry may be used to control the pump operation in response to the air detector. In this step, it may be beneficial for the housing and the compression seal to move slowly, smoothly and precisely to prevent any of the sample in the tubular member from seeping past or overshooting the air detector 56. This smooth and accurate repositioning of the sample by the dual resolution syringe could not be accomplished adequately in Bulk Mode, or with any large single piston syringe. A microprocessor controls how far the chamber must move to fill the volume between the air detector 56 and the probe tip 38, and communicates with the motor to move the additional required distance in the Differential Mode. This pushes the fluid sample in the tubular member 50 down until it is again flush with the probe tip 38 as in FIG. 12.9. Next, another individual sample volume aliquot or sample portion is separated from the remaining portion of the fluid sample in the tubular member 50 by bisecting it with a third quantity of air and then the sample is ejected from the probe tip 38 as explained above. These steps are repeated until the desired number of separate aliquots of sample have been dispensed.

In an alternative embodiment, the fluid sample in the tubular member is repositioned down to the first end or probe tip 38 in one step rather than in two steps. In the one step process, an air detector 56 is not required, but rather the sample is moved down the tubular member 50 by a distance that would approximately bring a portion of the sample to the level of the probe tip 38. However, the two step process may be preferred because then the exact position of the fluid sample in the tubular member is reset to a calibrated position in the first step, and the individual sample volume is measured out precisely and accurately in the second step. Additionally, while in one embodiment, the system is automated with an air detector 56 connected to the pump motor, the scope of the invention encompasses many manual operations and sample positioning detecting schemes as well.

In an alternative embodiment shown in FIG. 3, a piston 140 is tapered slightly with an outer diameter that decreases or increases over the length of the piston. It may be substituted for piston 40 in the other embodiments herein described. This increases the already large resolution range of the syringe because one can alter the resolution in the Differential Mode based on the level of the piston. For example, a syringe of the present invention with a housing inner diameter of 0.1814 and a piston with an outer diameter of 0.1804 inches will have Differential Mode resolution like that of a 10 uL syringe. If the same syringe is used with a piston that has an outer diameter of 0.1813 inches, the Differential Mode resolution will be like that of a 1 uL syringe (the distance between the inner surface 66 of the housing and the outer surface 64 of the piston will have decreased by 0.009 inches). With a piston whose diameter tapers from 0.1813 to 0.1804 one can vary the resolution of the Differential Mode between that of a 10 uL syringe and that of a 1 uL syringe just by performing the liquid metering at the appropriate diameter level or range of the piston (through microprocessor control of the step positions, for example). As long as the taper of the piston from one end to the other is small, there is not a need for a different sized seal. In one embodiment, the taper is approximately between 0.001–0.009 inches. The taper could be outside of this range, but too large of a taper will create sealing problems between the outer diameter of the piston and the compression seal. However, it is understood that the allowable taper range can be increased by using a more flexible or more compressible seal.

The present invention is designed for use for either reusable syringes or disposable syringes. Typically the reusable market incorporates a glass portion of the housing, while a disposable one-time use syringe employs a plastic portion of the housing and or plastic tips. The present invention is not limited to a particular type of material or construction. Additionally, in the reusable syringe market, experience has shown that over time the seals may wear out from use requiring replacement parts. The scope of this invention covers the replacement parts associated with the present invention. For example, in one embodiment of the above described syringe assembly that includes an elongated housing with continuous sidewalls that define an outlet end, the present invention includes a closure means for movably sealing the outlet end along the inner surface of the sidewall. The closure means selectively defines different volumes within said housing and also defines an opening there through extending to said outlet end. An example of this embodiment would cover a replacement plunger and in one embodiment, the replacement plunger includes a cone-shaped seal with a channel there through with the larger end of the seal proximate the outlet end. As previously explained, this seal shape helps to catch any rising air bubbles and sweeps the air bubbles that are clinging to the walls inward and upward in the cone-shaped seal through the channel and out of the syringe.

Figure 13:
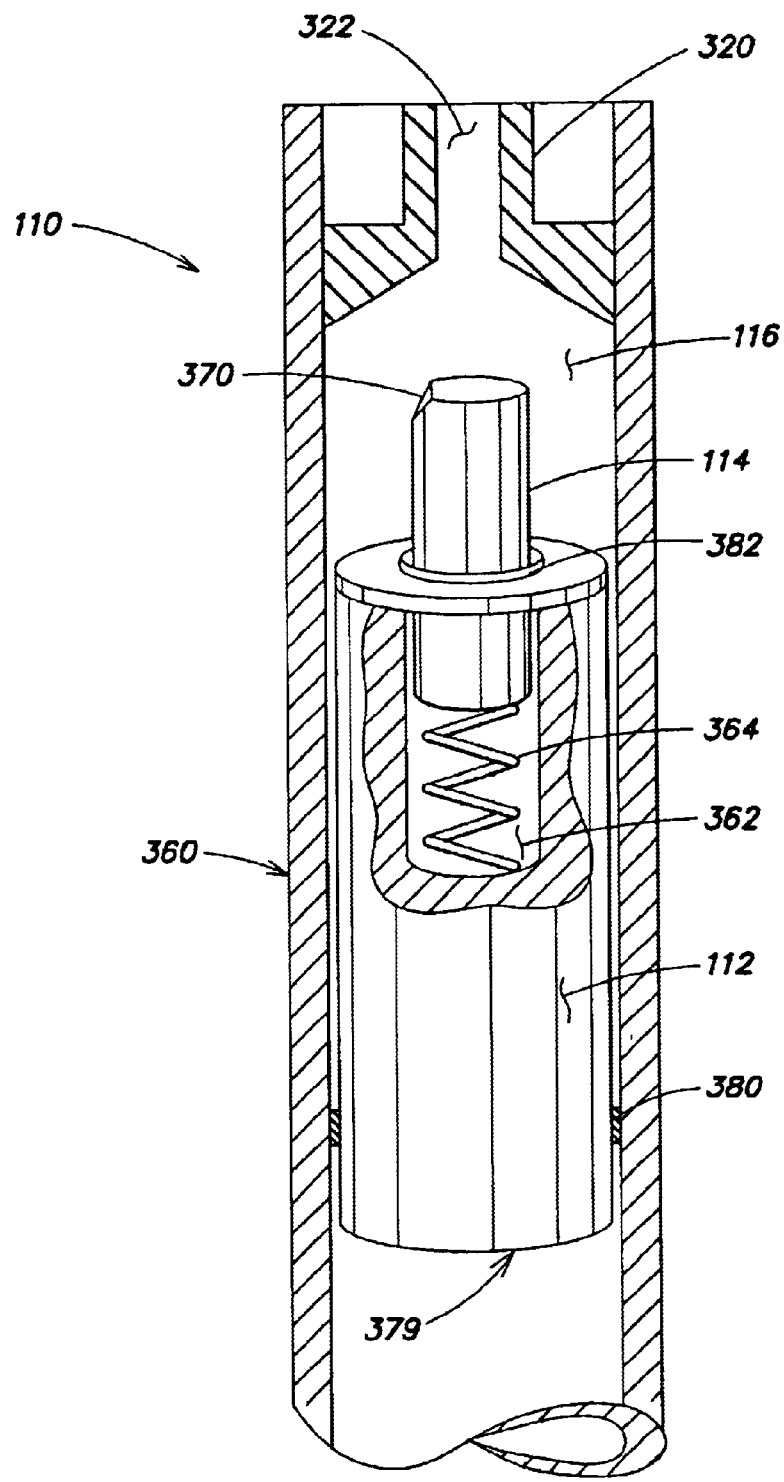
FIG. 13 illustrates a further alternative embodiment.

In an alternative embodiment, illustrated in FIG. 13 dual resolution is accomplished with a syringe 110 for selectively dispensing from a chamber 116 a first or second volume of fluid having different volumes in the order of at least 3 to 1. This syringe 110 includes a piston 379 positioned within the housing 360, and the piston includes at least two distinct segments, 112 and 114, the smaller of which may slide in and out of the larger segment via a seal 382. The first or larger segment 112 of the piston moves within the housing 360, varying the volume of the chamber 116. Likewise, the second or smaller segment 114 of the piston 379 moves within the housing, varying the volume of the chamber 116. The first and second segments of the piston 112, 114 can either move independently of one another or together. In one embodiment, the housing is stationary and both the first and second segments 112, 114 move relative the housing. In another embodiment, the housing is movable relative to the piston. The first segment 112 of the piston has a larger cross-sectional area compared to the second segment of the piston. In one embodiment, the cross-sectional area of the first segment is at least twice the difference between the cross-sectional areas of the first and second segments and can be much greater. This difference in cross-sectional areas helps to facilitate the dual resolution capabilities of the syringe. Further, if the housing also moves one may create a triple resolution syringe which may provide even finer resolution, increased precision and accuracy, including for miniscule samples. Movement of the first segment of the piston 112 varies the volume of the chamber in the above described Bulk Mode, while movement of the second segment of the piston 114 varies the volume of the chamber in the above described Differential Mode. FIG. 13 shows the outer surface of the first segment of the piston separated from to the inner surface of the housing by sealing means 380. The second segment 114 of the piston is encompassed within a recessed portion 362 in the first segment 112 and slides along seal 382 by spring 364. The means for selectively moving the first and second segments of the piston 112, 114 to displace a second and first volume of fluid includes all previously mentioned means in other embodiments of the present invention. Also, the scope of the invention includes other embodiments where the arrangement of the first and second segments of the piston within the housing is varied. Furthermore, this alternative embodiment may include a notch 370 in a piston segment to provide for fluid communication when the piston segment approaches the passage 322. This embodiment may be described as a telescoping piston arrangement, or also a plunger within a piston. The invention also contemplates the use of pistons with more than two segments.

The embodiment of FIG. 14 illustrates a telescoping piston/plunger arrangement similar to FIG. 13 incorporated into a stationary housing. This embodiment is advantageous because it enables dual resolution capability using the same glass housing of a conventional syringe. Segments 114 and 112 move relative to the stationary housing 360. Segment 114 is in a telescoping arrangement, capable of moving inside of segment 112. The volume of the chamber 116 is a function of the position of each segment 112 and 114.

All of the above described embodiments allow a volume of air to be aspirated that is many times greater than the size of one minute sample. This volume of air, along with the probe tip diameter, permits not only the precise aspiration of a minute sample by the fine resolution Differential Mode of the syringe but also the touchless intact ejection of that minute sample from the probe tip by the necessary high flow rate of the Bulk Mode.

In one embodiment, the single piston syringe of the present invention is provided with a dynamically sealed spring-driven piston that operates within a dynamically sealed hand or motor-driven housing. A chamber within the housing is defined by two seals that permit adjustment of the chamber volume by movement of the piston and the housing with respect to an immobile plunger. Two different space-occupying masses, the piston 40 and the housing 60, enable the syringe to accurately and precisely meter minute volumes of fluid while also deploying relatively large volumes and high powered flow velocities. This range of accuracy and flow capacity provides a unique ability to transfer minute liquid samples without the need to touch them off.

Figure 4A:
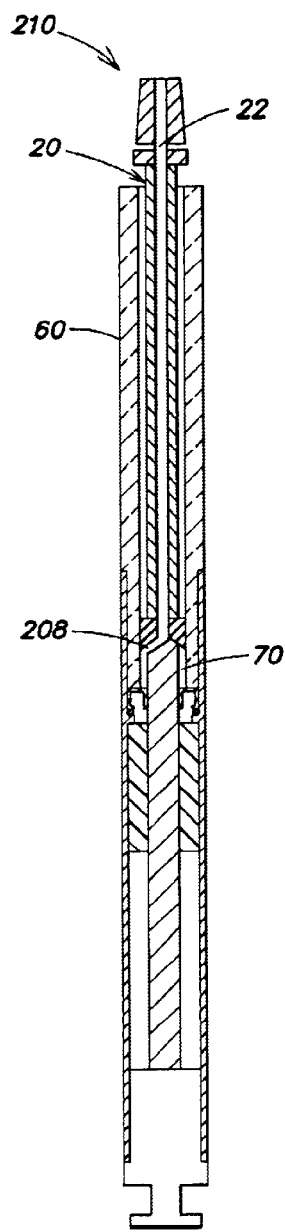
FIGS. 4A–4C illustrate one embodiment of the syringe that operates in a Differential Mode.
Figure 4B:
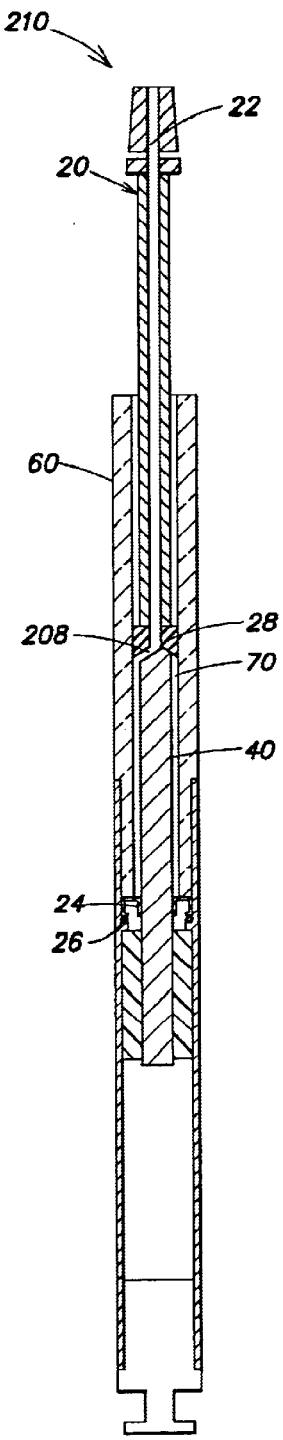
Figure 4C:
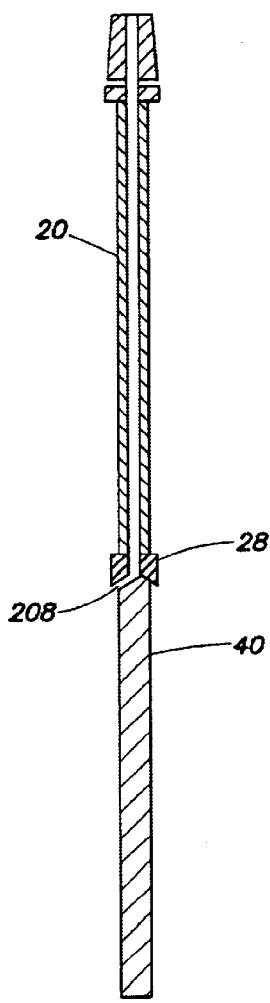

In the alternative embodiment illustrated in FIGS. 4A–4C, the syringe 200 only operates in Differential Mode. FIGS. 4A and 4B show how the first portion 70 of the chamber remains in fluid communication with the elongated passage extending through the plunger via a breakout hole 208. From FIG. 4A to FIG. 4B, the housing 60 moving down increases the volume in the chamber portion 70. In this embodiment, there is not a Bulk Mode, but rather the device only operates using the differential capability. FIG. 4C shows one embodiment where the plunger 20 and the piston 40 are formed into or from one piece, with the wiper seal 28 slid up over the assembly, fixed just above the breakout hole 208.

This embodiment shows how the present invention permits positive displacement fluid handling technology to meter samples in the microliter and nanoliter scale. When the positive displacement element, such as a piston or the plunger, moves toward the outlet, the fluid is pushed outward. When the positive displacement clement is withdrawn, it exerts a vacuum and pulls the fluid into the sampling device inward. Positive displacement devices are operated automatically or manually, and in general it is known that they are highly controllable and highly developed, reliable and trusted. Typical syringes operate as a positive displacement device. One example, is a syringe having a solid plunger with a typical Teflon tip at the end of the plunger serving as an outwardly-pressing seal when it slides against an inner surface of a tube. Other variations use different sealing materials such as polyethylene, and other rubber compounds, such as Buna, a synthetic rubber made from the polymerization of butadiene and sodium. Another variation of a positive displacement device includes a single piston that passes through a compression seal inside of a tube.

In the embodiment of FIG. 4, the housing forms a chamber defined by the inner surface of the housing 60 and spaced portions of the outer surface of the piston 40. In one embodiment, the cross-sectional shape of the chamber is annular, however other configurations may be used. This embodiment includes means extending from an end of the piston defining a passage for fluid to flow out of the chamber. In one embodiment, shown in FIG. 4C, there are means extending from an end comprising an extension of said piston having an axially extending passage with one end of the passage in fluid communication with the chamber and the other end of the passage extending outwardly of the chamber. Other means defining a passage for fluid flow may be unconnected to the piston. As described in other embodiments above, the embodiment of FIGS. 4A–4C may further include sealing means fixed to the inner surface of the housing, movable relative to the piston or plunger, forming an end of the chamber. This embodiment may also include a second sealing means fixed to the extension of the piston forming an end of the chamber. This embodiment is used for metering small and minute sample volumes and is advantageous over conventional syringe designs because minute sample sizes can be accurately aspirated using larger components. Since the chamber size is defined as the volume in between the piston and the housing, the outer diameter of the syringe housing can be identical to that of a conventional syringe (and one can use that very conventional syringe housing), and yet the sizes of the piston and sealing means inside can be much larger than in a conventional syringe but give the same resolution capabilities. A preferred embodiment of this is to use the glass housing of a conventional 1 mL syringe (OD 0.355" and ID 0.1814") with a piston OD of 0.1804", giving resolution as fine as a 10 uL syringe. For the conventional syringe to have such fine resolution, the ID of the glass housing would need to be a tiny 0.019" and the plunger with its tip seal a corresponding filamentous piece of similar size, with all the sealing and manufacturing problems discussed above. Additionally, this embodiment may be modified to include a piston that has a frusto-conic section forming a tapered section and at least one resilient seal between the inner surface of the housing and a portion of the frusto-conic section.

As described above, the market for positive displacement devices, in particular in the medical and biomedical fields, has demanded finer and finer resolution with better precision and accuracy in metering smaller and smaller samples. This has led to positive displacement devices with smaller inner diameters. However, when manufacturing smaller and smaller inner bores, difficulties arise when trying to maintain precision and accuracy throughout the length. This is also challenging with glass for example, where the internal channel is formed over a mandrel. In addition, small inner diameter bores requires small seals. Both tip seals and compression seals are very difficult to manufacture with precision, and due to their size they wear out and consequently leak relatively quickly.

Due to the difficulty in manufacturing rugged seals, an alternative approach is to eliminate the separate seals so that the sealing takes place between the hard material outer surface of the plunger or piston and the inner surface of the bore tubing directly. In the past, ultra precise and often custom-ground glass syringe plungers were made to slide close inside glass tube bores so that glass provided a liquid tight or even air tight seal on glass. Ceramic pistons inside of ceramic bores have also been used successfully. However, this design leads to many limitations on materials of use, tends to be expensive, and the rigid materials are prone to jamming up if any solid particles get inside, such as salt crystals following evaporation. Therefore, these alternative approaches to the sealing problem have had limited economical and application value.

However, the present invention overcomes all of these difficulties because there is no need for smaller and smaller parts and seals to meter smaller and smaller volumes by positive displacement technology when using the Differential Mode. To reiterate, a traditional extremely fine resolution 10 microliter glass syringe (which is the standard 6 cm or 2.37 inches in length) has a housing tube outer diameter that is a comfortable approximately 0.355 inches but an inner diameter bore of only 0.019 inches. The tiny ID corresponds to the seal size required, and is about as thin as a needle. This is too small for most practical automated applications but is used in special research applications. The present invention, with its Differential Mode, can give the same fine resolution equivalent to the above described 10 microliter volume syringe by using a housing or tube with a similar outer diameter but a practical sized inner diameter of 0.181 inches (4.6 mm) in conjunction with a piston outer diameter of 0.180 inches. The relatively large size of the elements inside the housing of the present invention are much more practical to manufacture and incorporate into an automated system, and it eliminates the sealing problems associated with using tiny seals.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only, and the scope of the invention is limited by the appended claims and their equivalents.

What is claimed is:

1. A syringe for metering and dispensing incrementally different volumes of fluid comprising:
   a plunger, having a first end and a second end, with an elongated passage extending therethrough, wherein fluid is metered and dispensed through the plunger;
   a housing concentric with and movable relative to the plunger and at least in part defining a fluid receiving chamber at the second end of the plunger;
   a piston positioned and longitudinally movable in and relative to the housing, the piston shaped and sized to occupy selected volumes of the chamber and having an outer surface at least in part spaced from the inner surface of the housing; and
   sealing means forming an end of the chamber remote from the second end of the plunger, said means fixed to the inner surface of the housing and movable relative to the piston, whereby movement of the piston toward the plunger initially reduces the volume of the chamber by a first volume equal to the change in the volume of the piston positioned between the sealing means and the plunger, and thereafter a second volume by relative movement of the sealing means and piston.

2. The syringe of claim 1, wherein the outer diameter of the piston decreases over the length of the piston.

3. The syringe of claim 1, wherein the piston is sized to only move a portion of the fluid in said chamber into the elongated passage extending through the plunger.

4. The syringe of claim 3, further comprising a tubular member adjacent to the plunger, wherein a fluid sample is aspirated and/or ejected through a first end of the tubular member.

5. The syringe of claim 4, further comprising a chamber valve at the connection between the tubular member and the plunger, wherein the chamber valve controls the direction of fluid flow out of the elongated passage and the source of fluid into the elongated passage.

6. The syringe of claim 4, further comprising an air shunt extending from the tubular member in communication with an air shunt valve, wherein air entering the air shunt through the air shunt valve flows into the tubular member and bisects the fluid in the tubular member.

7. The syringe of claim 1, wherein the sealing means and piston are positioned within the housing to move a portion of the fluid in said chamber into the elongated passage extending through the plunger.

8. The syringe of claim 1, further comprising a resilient means for generating forces to move the piston within the housing.

9. The syringe of claim 8, wherein an elongated space is provided within the piston receiving a portion of the resilient means and engaging one end of the resilient means.

10. The syringe of claim 9, further comprising a housing cap defining an end of the housing, wherein the housing cap engages one end of the resilient means.

11. The syringe of claim 10, wherein the resilient means is a helical spring.

12. The syringe of claim 11, further comprising a post extending from the housing cap and coaxially with the helical spring.

13. The syringe of claim 1, further comprising means for moving the housing with respect to the plunger.

14. The syringe of claim 13, wherein the means for moving the housing is automated.

15. The syringe of claim 1, wherein the cross-sectional area of the piston is greater than the cross-sectional area of the passage extending through the plunger.

16. The syringe of claim 1, wherein at least a portion of the chamber is annular shaped, defined at least in part by the outer surface of the piston and the inner surface of the housing.

17. A syringe for metering and dispensing incrementally different volumes of fluid comprising:
    a plunger with an elongated passage extending therethrough:
    a housing concentric with and movable relative to the plunger and at least in part defining a fluid receiving chamber at one end of the plunger;
    a piston positioned and longitudinally movable in and relative to the housing, the piston shaped and sized to occupy selected volumes of the chamber and having an outer surface at least in part spaced from the inner surface of the housing; and
    sealing means forming an end of the chamber remote from the one end of the plunger, said means fixed to the inner surface of the housing and movable relative to the piston, whereby movement of the piston toward the plunger initially reduces the volume of the chamber by a first volume equal to the change in the volume of the piston positioned between the sealing means and the plunger, and thereafter a second volume by relative movement of the sealing means and piston; and
    further comprising a second sealing means for the chamber, said second sealing means fixed to the plunger, positioned between the plunger and the inner surface of the housing, and defining an end of the chamber proximal the plunger.

18. The syringe of claim 17, wherein the second sealing means is cone-shaped with a channel therethrough, positioned with the larger end proximate the chamber and the smaller end proximate the plunger.

19. A syringe for metering sequential different volumes of fluid contained in the syringe including:
    a housing;
    a piston within the housing; and
    a plunger extending from the housing;
    a chamber formed in the housing between the plunger and a sealing means between the piston and the inner surface of the housing;
    the piston having a volume less than the volume of that portion of the chamber that is coextensive with the portion of the piston in the chamber;
    the plunger having an elongated passageway extending therethrough:
    means for aspirating a first volume of said fluid by movement of the sealing means relative to the piston, and thereafter a second lesser volume of fluid by further movement of the sealing means relative to the piston; and
    means for ejecting the second volume of fluid through the elongated passage in the plunger by movement of the piston relative to the plunger.

20. A syringe as set forth in claim 19 including a cap closing the end of the housing remote from the plunger, said piston having a wall defining an elongated space extending from one end of the piston to a point short of the other end of the piston, and a helical spring positioned in the elongated space with one end engaging the cap.

21. A syringe as set forth in claim 20 including a post extending from the cap and coaxially with the helical spring.

22. A syringe as set forth in claim 19, wherein the first volume of fluid is in the order of magnitude of 10 times the second volume of fluid.

23. A syringe as set forth in claim 19, wherein the first volume of fluid is in the order of magnitude of 100 times the second volume of fluid.

24. A syringe as set forth in claim 19, wherein at least a portion of the chamber is annular shaped, defined at least in part by the outer surface of the piston and the inner surface of the housing.

* * * * *